(12) United States Patent
Greenbaum et al.

(10) Patent No.: US 6,285,377 B1
(45) Date of Patent: **\*Sep. 4, 2001**

(54) METHOD AND APPARATUS FOR GENERATING A SMOOTH NORMALIZED STAR DIAGRAM

(75) Inventors: Albert Greenbaum, Spring Valley; Martin Sorette, Ossining, both of NY (US); Jolanta Kunicka, Ridgewood; Gena Fischer, Harrington Park, both of NJ (US)

(73) Assignee: Bayer Corporation, Tarrytown, NY (US)

( \* ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,974

(22) Filed: Jun. 26, 1997

(51) Int. Cl.$^7$ ................................ G06T 11/20; A61B 5/00
(52) U.S. Cl. ............................................. 345/441; 600/300
(58) Field of Search ...................... 345/441, 133, 345/138–140, 439, 440; 600/300, 309, 320, 328, 368, 485; 702/127, 150–153, 179–181, 189–199, 135, 139

(56) References Cited

U.S. PATENT DOCUMENTS

| | | | |
|---|---|---|---|
| 4,562,843 | \* | 1/1986 | Djordjevich et al. ............... 600/485 |
| 4,675,147 | \* | 6/1987 | Schaefer et al. ..................... 376/245 |
| 5,843,689 | \* | 12/1998 | Anderson ............................ 435/7.24 |

OTHER PUBLICATIONS

Walters, Jerry, "The New CBC," 1995.
Zitko, V., "Butterflies' for Pattern Recognition," Access Jan./Feb. 1990.
Chernoff, Herman, "The Use of Faces to Represent Points in k–Dimensional Space Graphically," Journal of the American Statistical Association, v. 68, 1973, pp 361–68.

"Automated Hematology Analyzer, SE–9000: Scattergram Report Based on Clinical Cases," TOA Med. Electronics Corp., Dec. 1993.

Geurts et al., "Pattern Recognition of Multivariate Analytical Data by Plots of High Dimensional Data," Analytica Chimica Acta, v.176, 1985, pp. 253–257.

Wolf, Paul L., "Interpretation of Biochemical Panels Utilizing Computer Analysis," University of Connecticut Health Center Library, 1986.

Hoeke et al., "Graphical Non–Linear Representation of Multi–Dimensional Laboratory Measurements in Their Clinical Context," Meth. Infor. Med., 1991, v.30, 138–44.

\* cited by examiner

*Primary Examiner*—William A. Cuchlinski, Jr.
*Assistant Examiner*—Thu Nguyen
(74) *Attorney, Agent, or Firm*—Andrew L. Klawitter; John M. Paolino

(57) ABSTRACT

A system and method for displaying parameters in a smoothed normalized star diagram where parameters are received from a medical laboratory instrument and processed. The processing includes calculating a normalized parameter value for each parameter using a predetermined mean and standard deviation and scaling the resulting normalized parameter value using a range restricting function. Each scaled parameter is assigned to a spoke and rays are drawn between adjacent spokes at a small angular interval. The ends of the rays are then joined by line segments, thereby constructing a smooth overall diagram.

37 Claims, 31 Drawing Sheets

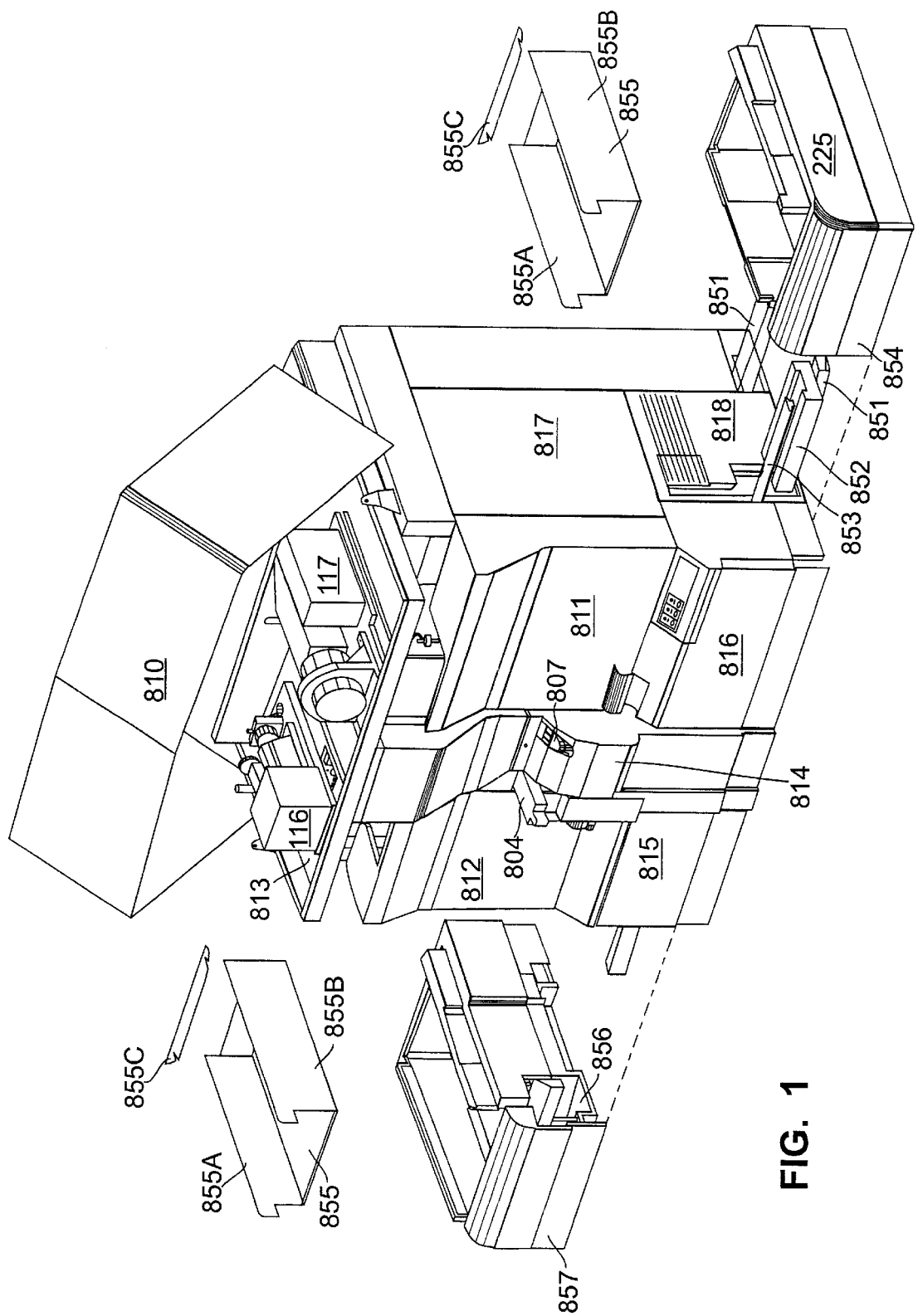

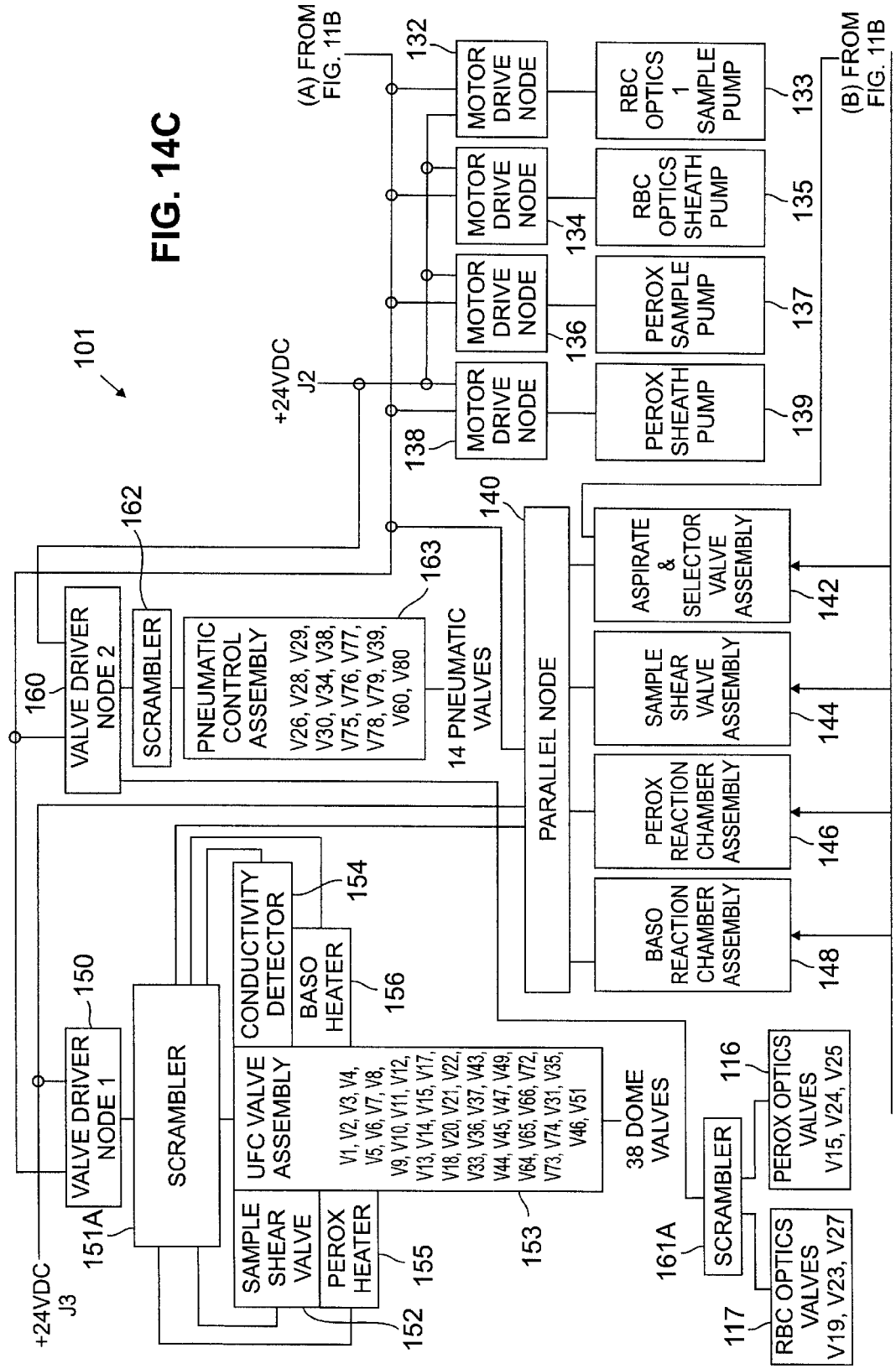

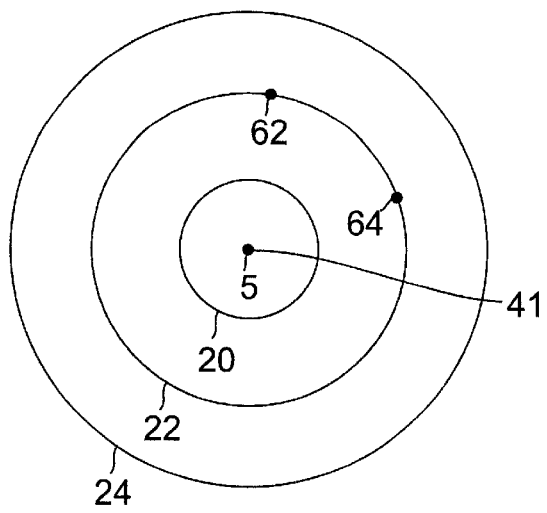
FIG. 22  STEP 4
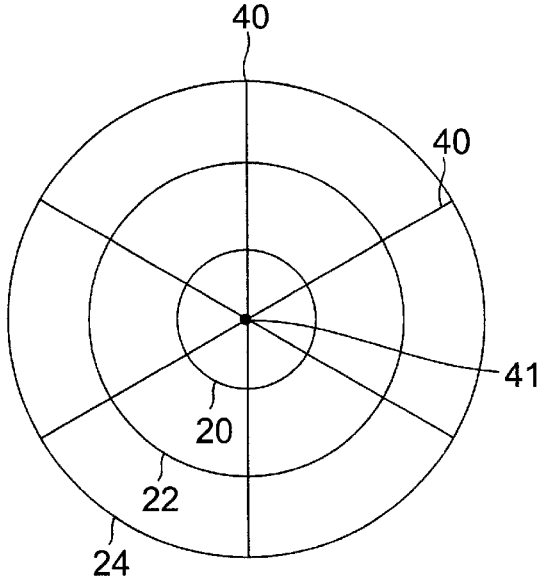
FIG. 23  STEP 5
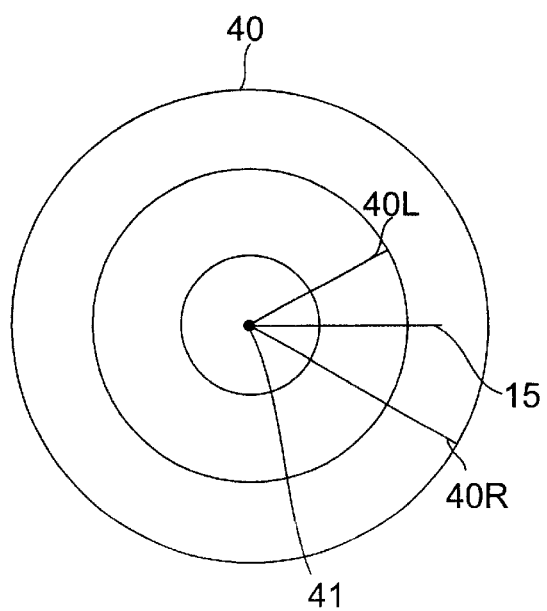
FIG. 24  STEP 6

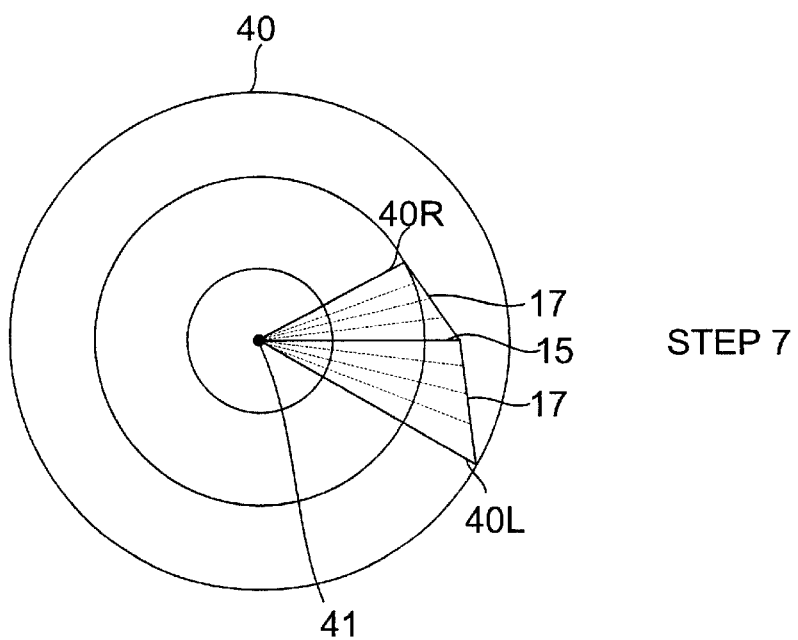
FIG. 25  STEP 7

METHOD AND APPARATUS FOR GENERATING A SMOOTH NORMALIZED STAR DIAGRAM

FIELD OF THE INVENTION

The present invention generally relates to systems used for displaying graphical representations of numbers, and more particularly to a system and method capable of representing numbers in a star diagram for easier human comprehension

BACKGROUND OF THE INVENTION

Over the years, various hematologic, chemical, and other laboratory analytical instruments have become increasingly more sophisticated. With the realization of computers and automation, these instruments have the ability to generate tremendous amounts of numerical data which need to be analyzed and interpreted by human operators.

Humans, however, are only capable of retaining and recalling, on the average, about five numbers at a given time. In situations where decisions or diagnoses must be made based on the interrelationship among multiple numbers, the human utilization range falls to only two to three numbers. Such a small utilization range severely restricts the human operator's ability to use the full potential and capabilities of the increasingly sophisticated analytical instruments.

In contrast, humans have little difficulty making decisions based on visual clues, such as graphical shapes (e.g., we can easily distinguish a car from a horse; a yield sign from a stop sign). One conventional approach that uses human abilities to recognize patterns is the projection of multi-dimensional patterns in a two-dimensional or pseudo three-dimensional plane. This method requires a tremendous amount of computation and effort to ascertain which plane provides the most information. Another well-known graphical representation of multiple numbers is the use of "Chernoff Faces", as described by Dr. Herman Chernoff in "The Use of Faces to Represent Points in k-Dimensional Space Graphically", Journal of the American Statistical Association, June, 1973, Volume 68, pp. 361–368. In this method, data is represented by a cartoon of a face whose features, such as length of the nose and curvature of the mouth, correspond to multivariate observations.

This system, however, lacks the ability to generate a point of reference or clear clinical decision levels. Therefore, once the test results are translated into facial features, no meaningful comparison can be made by the user between the values of the test results and any reference value or clinical decision level. In addition, some people find that using funny faces to represent data can be distracting and not in good taste, especially when the faces represent data corresponding to different ill patients.

Other popular methods involve using polygon or star based representations of parameters. In general, these methods begin with a central point and a plurality of radial axes at angles of $2\pi/n$, where n represents the number of parameters to be displayed. Each parameter value is then represented by a representation point on each axis, with the distance from the center point to the representation point reflecting the magnitude of the parameter. A polygon or a star is then constructed by connecting the representation points of all the displayed parameter values.

Unlike the Chernoff method, star-based representations offer a quick comparison of a test result with its "normal range." In other words, a standard or "universal" diagram, indicating a normal range of values for a particular disease state, can be generated using empirical values and published data for a given disease condition. This allows a user to compare test data to the standard in order to determine a particular condition quickly. However, star-based methods also contain sharp spikes due to abnormally large values that appear on the resulting diagrams which divert human attention from the overall shape of the figure. Moreover, an individual parameter with an usually large value is capable of dominating, and sometimes preventing, all other parameters from forming the shape of the diagram.

Thus, there remains a need for a method and system to produce a diagram representing a plurality of data that is easy to comprehend, that is capable of restricting values that would otherwise dominate a set of data, and that makes it easy for the viewer to focus on an entire diagram.

SUMMARY OF INVENTION

Accordingly, it is an object of the present invention to represent a plurality of parameters in a graphical form that is easily comprehended and retained by the viewer.

It is another object of the invention is to display the parameters in a smooth normalized star diagram.

It is another object of the invention to restrict a parameter value that would otherwise dominate a displayed data set.

It is still yet a further object of the invention to provide a method and system for displaying a plurality of parameters which can be used to display diagrams representative of different clinical states.

These and other objects of the invention are met by providing a method and system capable of displaying a plurality of raw parameters that first determines a mean normal parameter value and the standard deviation of the mean normal value for each parameter. A normalized parameter value is determined as a function of the raw parameter value, mean normal value and the standard deviation. The normalized value is then scaled by a range restricting function which determines a displayed parameter value corresponding to the raw parameter value. An area defined by the mean normal value and the standard deviation corresponding to each of the raw parameters is drawn comprising three concentric circles having a common center, wherein the inner-most circle represents the mean normal value minus the standard deviation, the middle circle represents the mean normal value, and the outer-most circle represents the mean normal value plus the standard deviation. Subsequently, the displayed parameter value is assigned a spoke. The length of the spoke is equal to the magnitude of the displayed parameter value. The number of spokes is equal to the number of determined displayed parameter values. The spokes are displayed at equal angular intervals around the domain defined by the three concentric circles. Between adjacent spokes, a plurality of rays are then drawn, wherein the length of each ray is proportional to the weighted sum of the spokes' length on either side of the ray. The ends of adjacent rays are then connected by line segments, thereby producing a smooth normalized diagram.

BRIEF DESCRIPTION OF THE DRAWINGS

Further features and advantages of the invention will become apparent from the drawings and the following detailed description of the inventions, in which like reference characters refer to like elements, and in which:

FIG. 1 is an elevated perspective view of an apparatus in accordance with a preferred embodiment of the present invention, shown in partial exploded view;

FIGS. 14A–14E are schematic block diagram of the electronic architecture of a preferred embodiment of the present invention;

FIGS. 22–25 are diagrammic views showing the steps of the method of FIG. 21;

DETAILED DESCRIPTION OF THE INVENTION

Figure 1A:
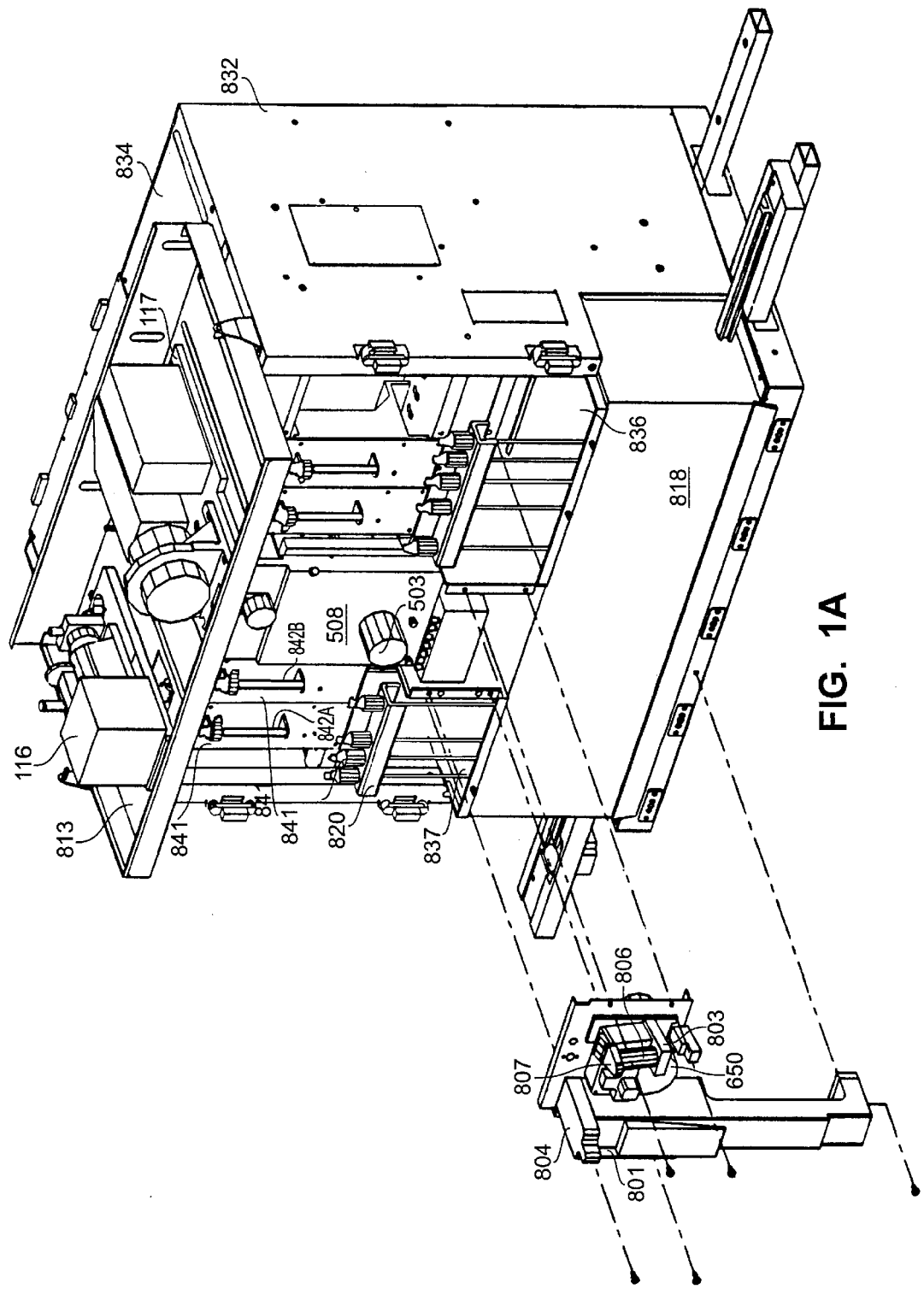
FIG. 1A is a partial exploded and disassembled view of the instrument of FIG. 1.
Figure 2A:
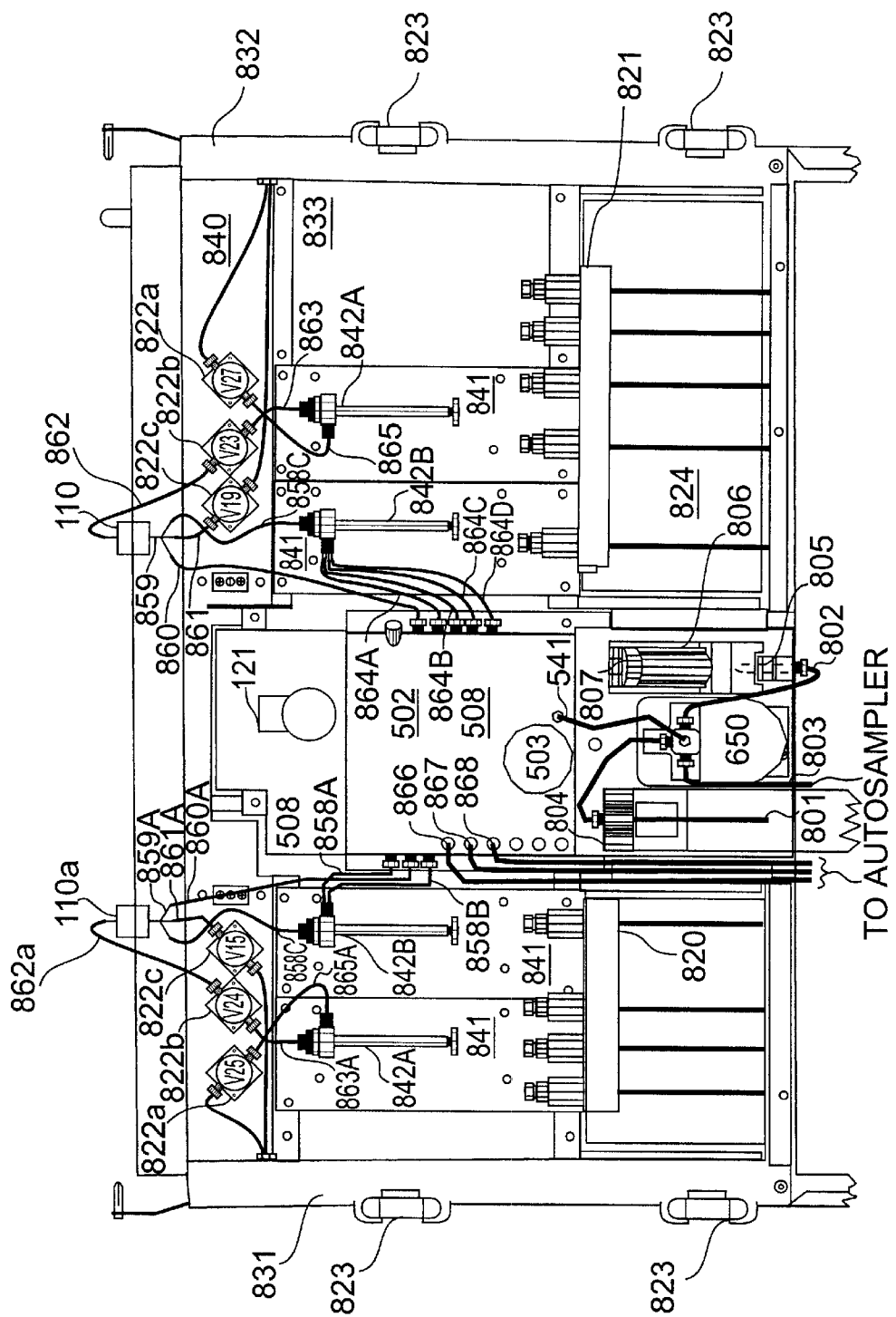
FIGS. 2A and 2B are respectively front views of the hydraulic and fluid portion of FIG. 2A for sample aspiration and pumping.
Figure 2B:
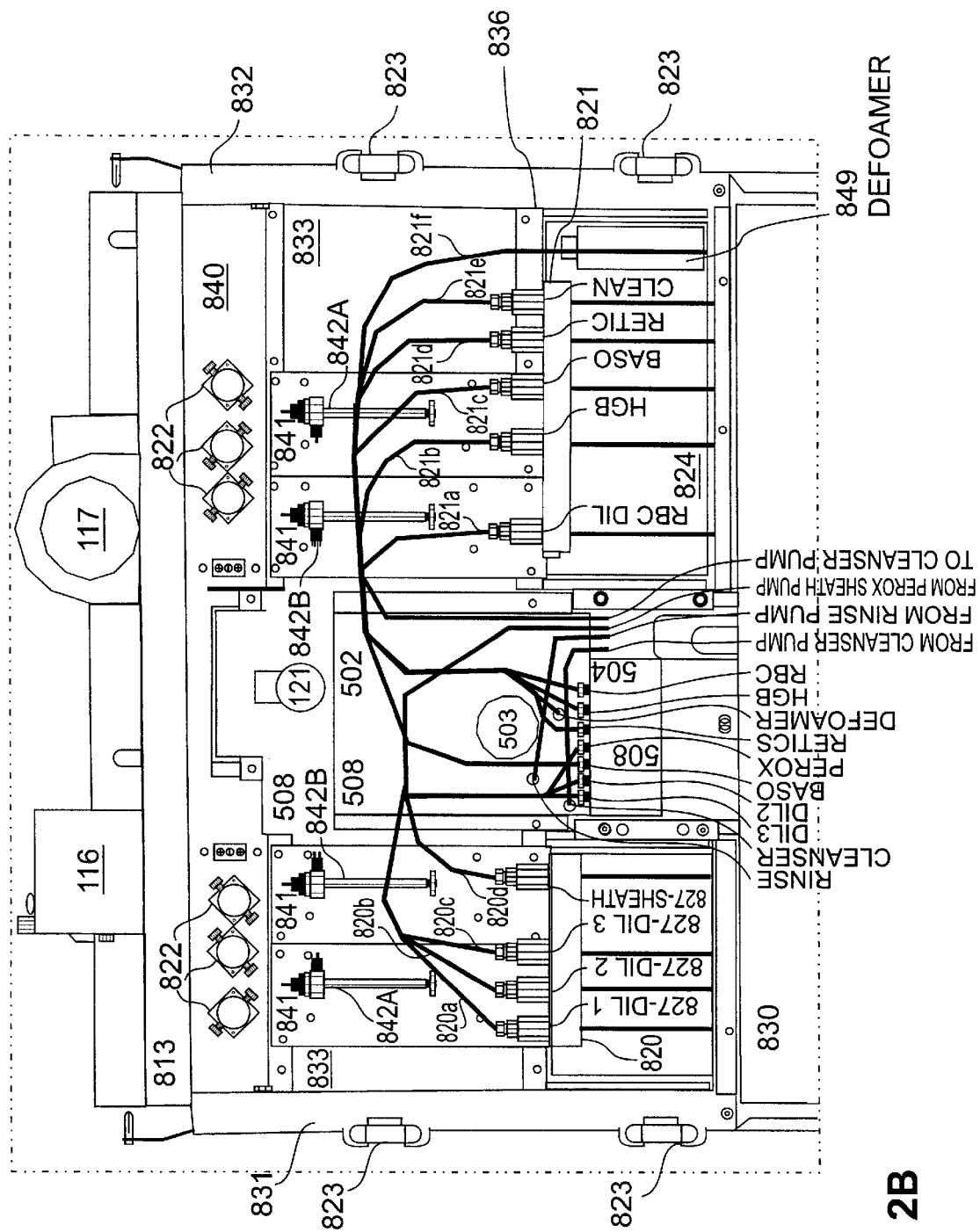
Figure 3A:
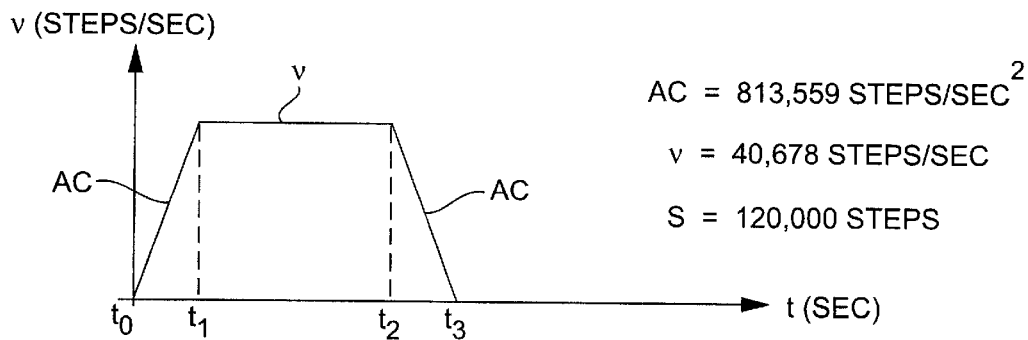
FIGS. 3A–3B are representative pump profiles for the syringe pumps of FIG. 1A.
Figure 3B:
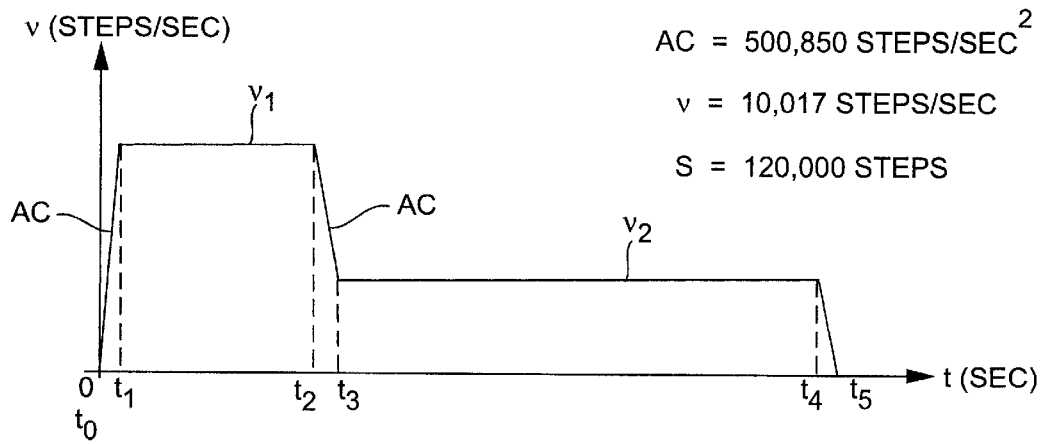
Figure 4:
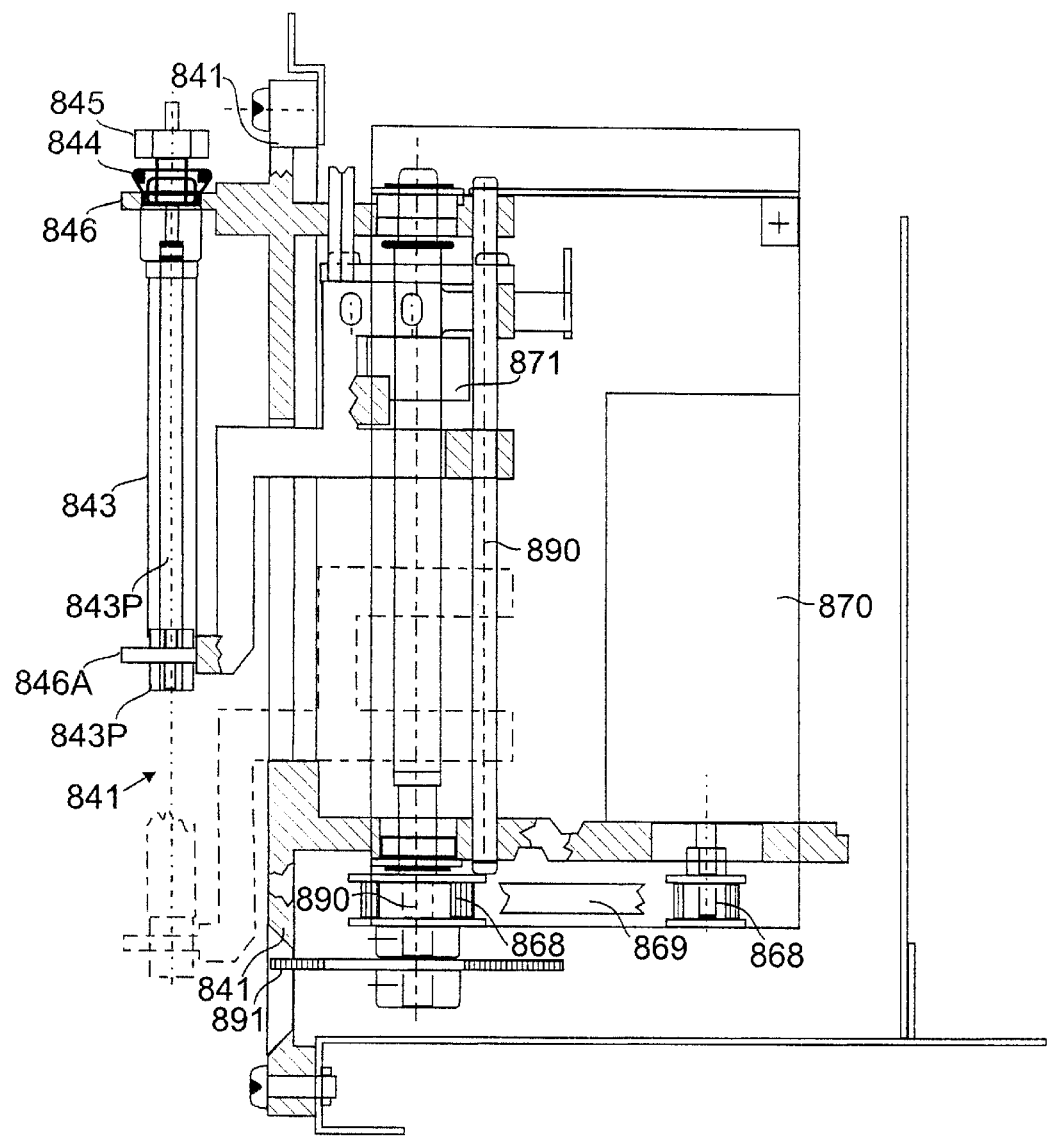
FIGS. 4 is a side sectional view of a syringe pump of FIG. 1A.
Figure 5:
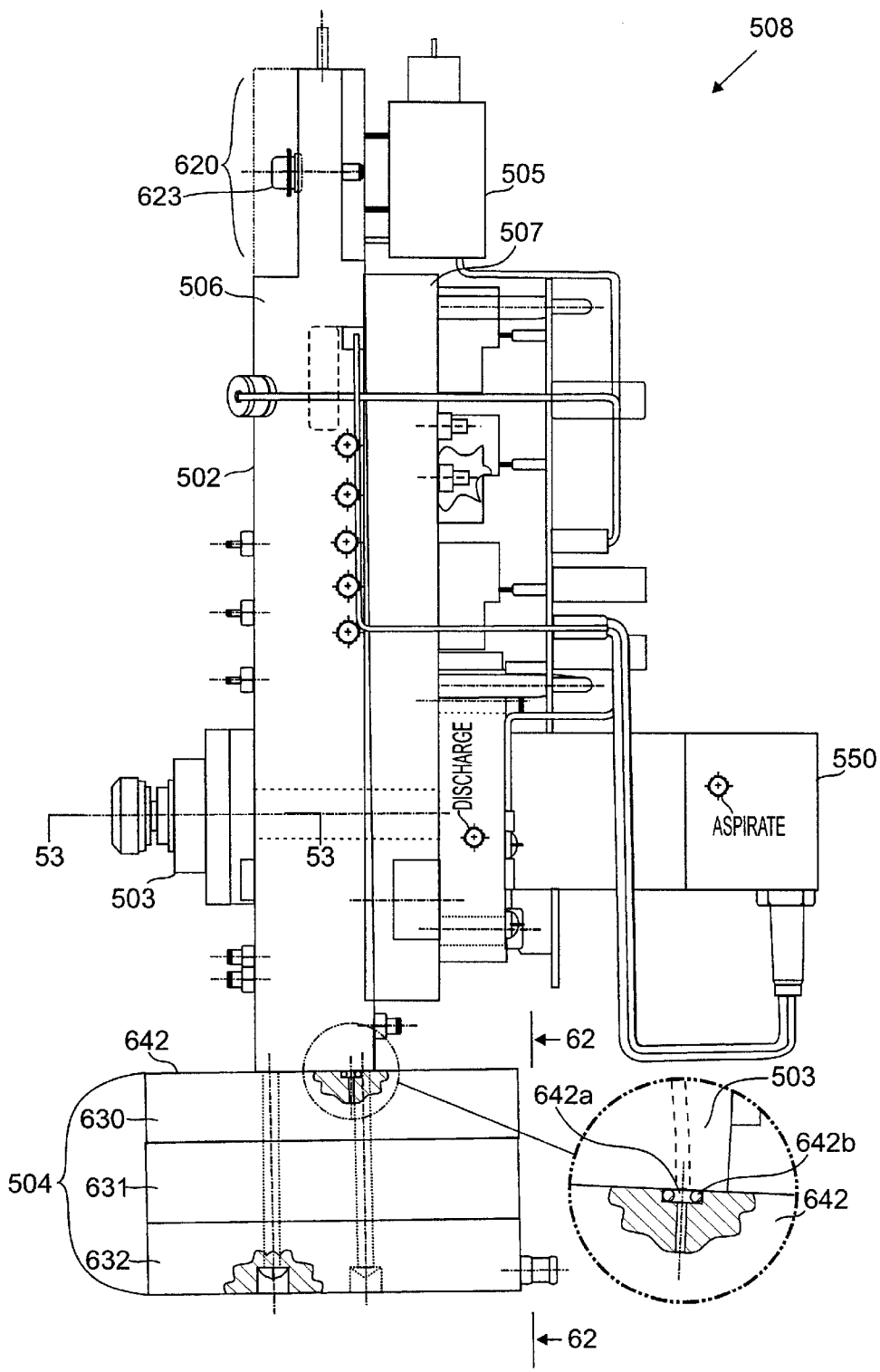
FIG. 5 is a side view of the unified fluid circuit assembly in accordance with a preferred embodiment of the present invention.
Figure 6:
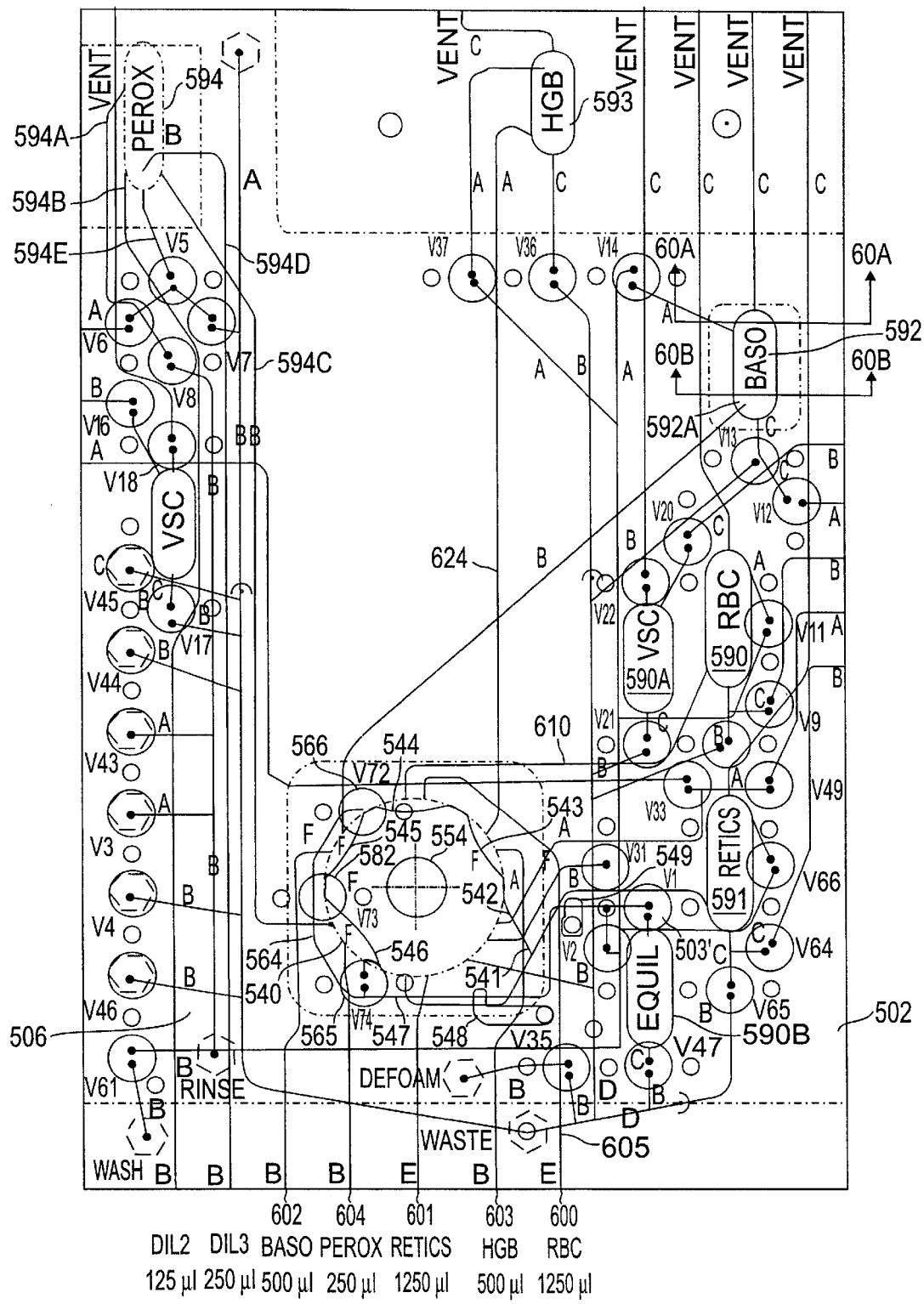
FIG. 6 is a front plane view of the unified fluid circuit (UFC) of the unified fluid circuit assembly of FIG. 5.

The method and system of the present invention is applicable to and will be described with reference to a blood sample analyzer of the type described in U.S. Ser. No. 08/688,476, "AN ANALYTICAL INSTRUMENT HAVING A CONTROL AREA NETWORK AND DISTRIBUTED LOGIC NODES" which application is copending, commonly assigned and is also incorporated herein by reference. It is, however, to be understood that the following method and system may be used with any analytical or electrical instrument that is used in the field of medicine, for example, in immunology and clinical chemistry.

A. Overview

Referring to FIGS. 14A–14D, 1A, 2A–B, 3A–B, 4, 6 and 7, blood samples for analysis in the flow cytometer instrument of the blood analyzer 10 are aspirated by vacuum into a sample input port 541 of a unified flow circuit (UFC) assembly 508. In the UFC assembly 508, the blood sample is separated into one or more predetermined aliquots by a shear valve 503, the different aliquots are then mixed with one or more reagents in different reaction chambers, to prepare the aliquots for different analyses. The reacted mixtures are then analyzed in one or more of an RBC/BASO/RETIC optical bench 117, a PEROX optics bench 116, or a HGB colorimeter 121. These analyses are performed independently under the control of a System Controller 105, which is preferably in turn controlled by an operator using a computer workstation 103. As a result, more than one reacted mixture may be formed from different aliquots of the same blood sample and examined in the same flow cell 110 (or flow cell 110A) to obtain different scatter and absorption data from the same blood sample under different reactions at different times. Advantageously, a blood sample may be analyzed to generate multiple parameters for the analysis of different disease conditions.

B. Generating Raw Parameters

As discussed above, the blood sample is separated into one or more predetermined aliquots by the shear valve 503 and then respectively mixed with a plurality of reagents to generate mixtures inside different reaction chambers for analysis. Individual tests are performed to determine absorption and scatter data from each of the reaction mixtures formed from the blood sample. The blood analyzer has a PEROX (peroxidase) optical bench 116, RBC/BASO/RETIC (red blood cells, basophiles, and recticulocytes) optical bench 117, and a HGB (hemoglobin) colorimeter 121, all of which generate a plurality of data.

The different bench systems will be described in some detail below.

1. HGB Colorimeter

Figure 7:
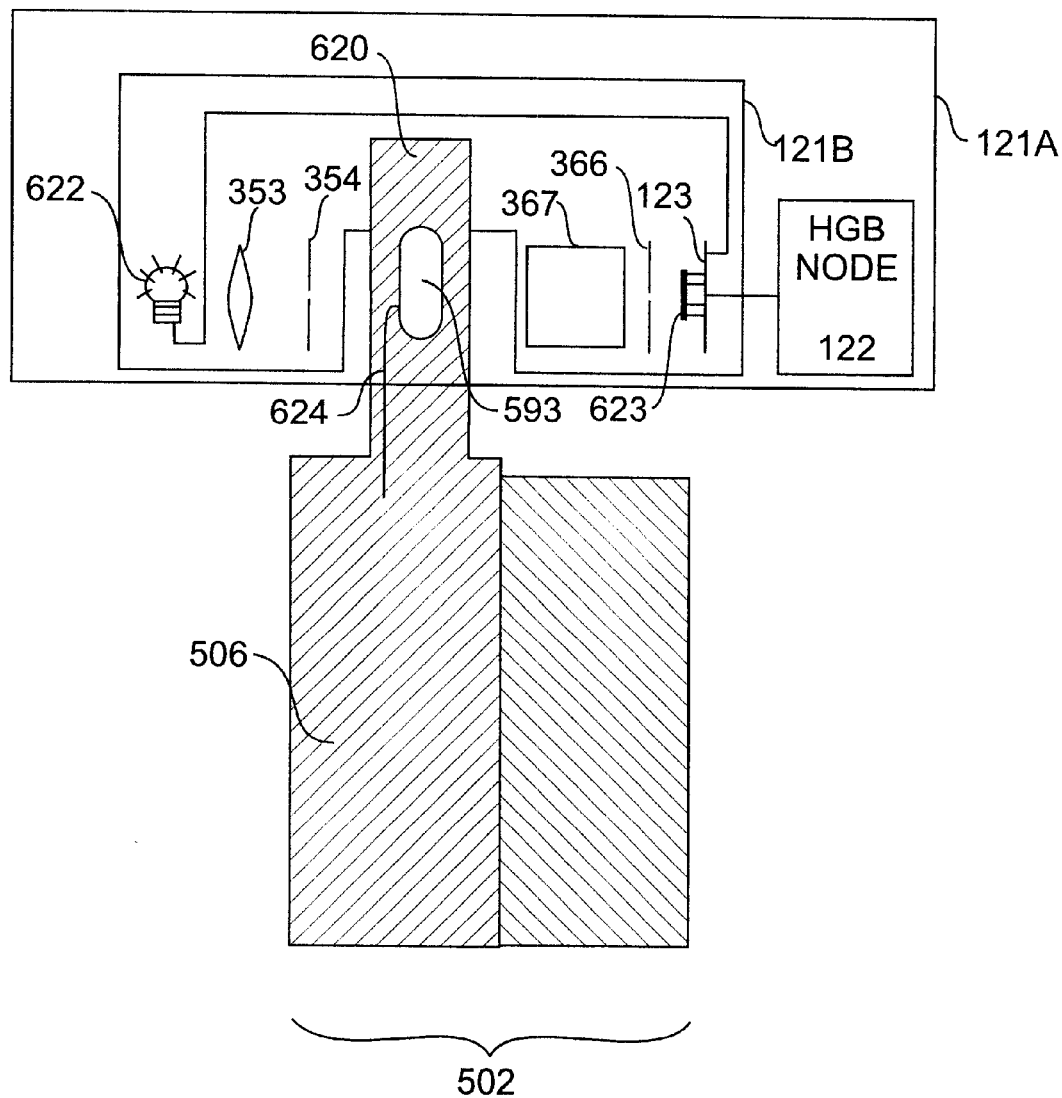
FIG. 7 is a sectional view of the HGB reaction chamber of FIG. 6 and the HGB colorimeter in accordance with an apparatus of the present invention.
Figure 8:
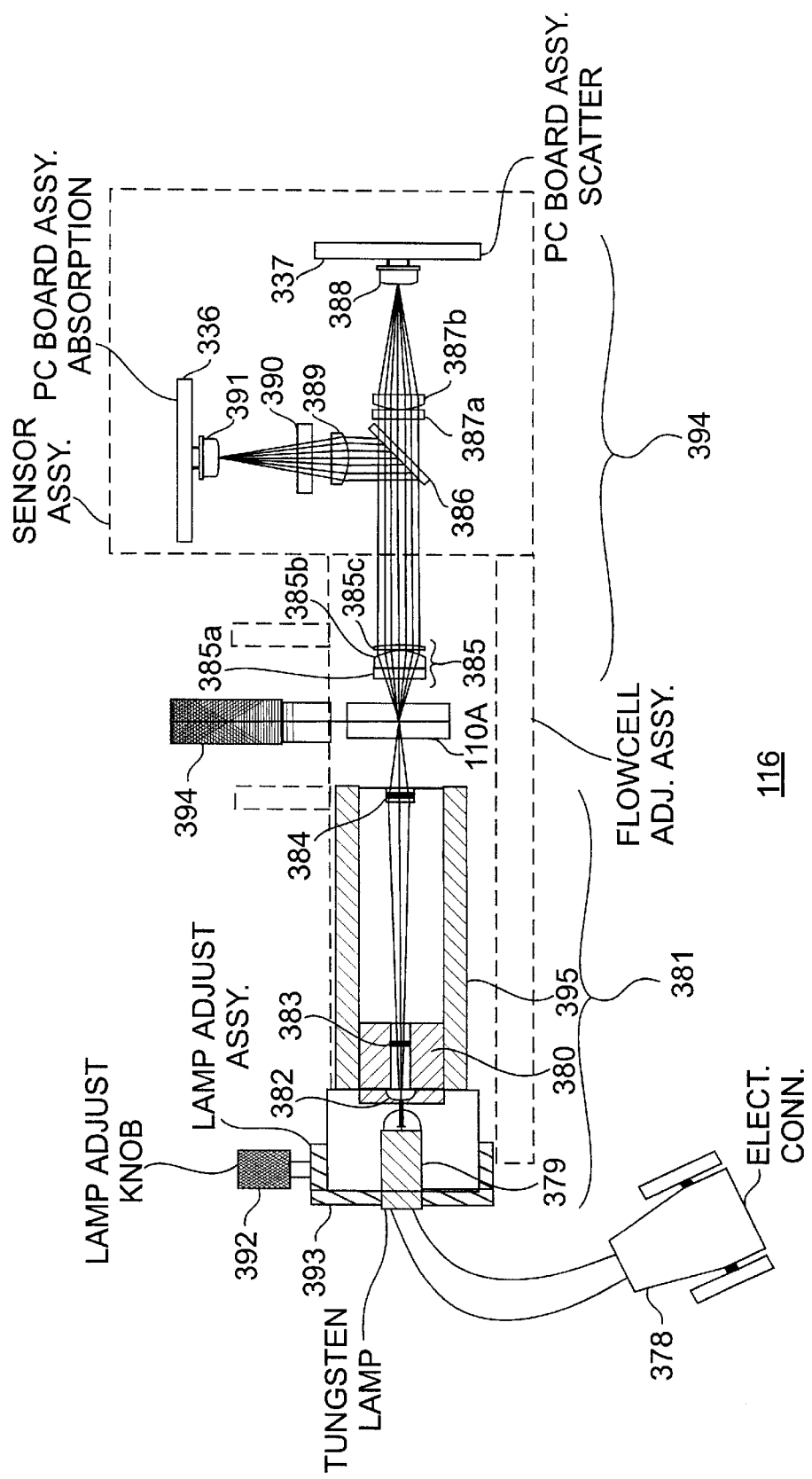
FIGS. 8 and 9 are schematic diagrams of a lamp optical bench and detectors for use in a peroxidase optical channel in a device in accordance with the present invention.
Figure 14A:
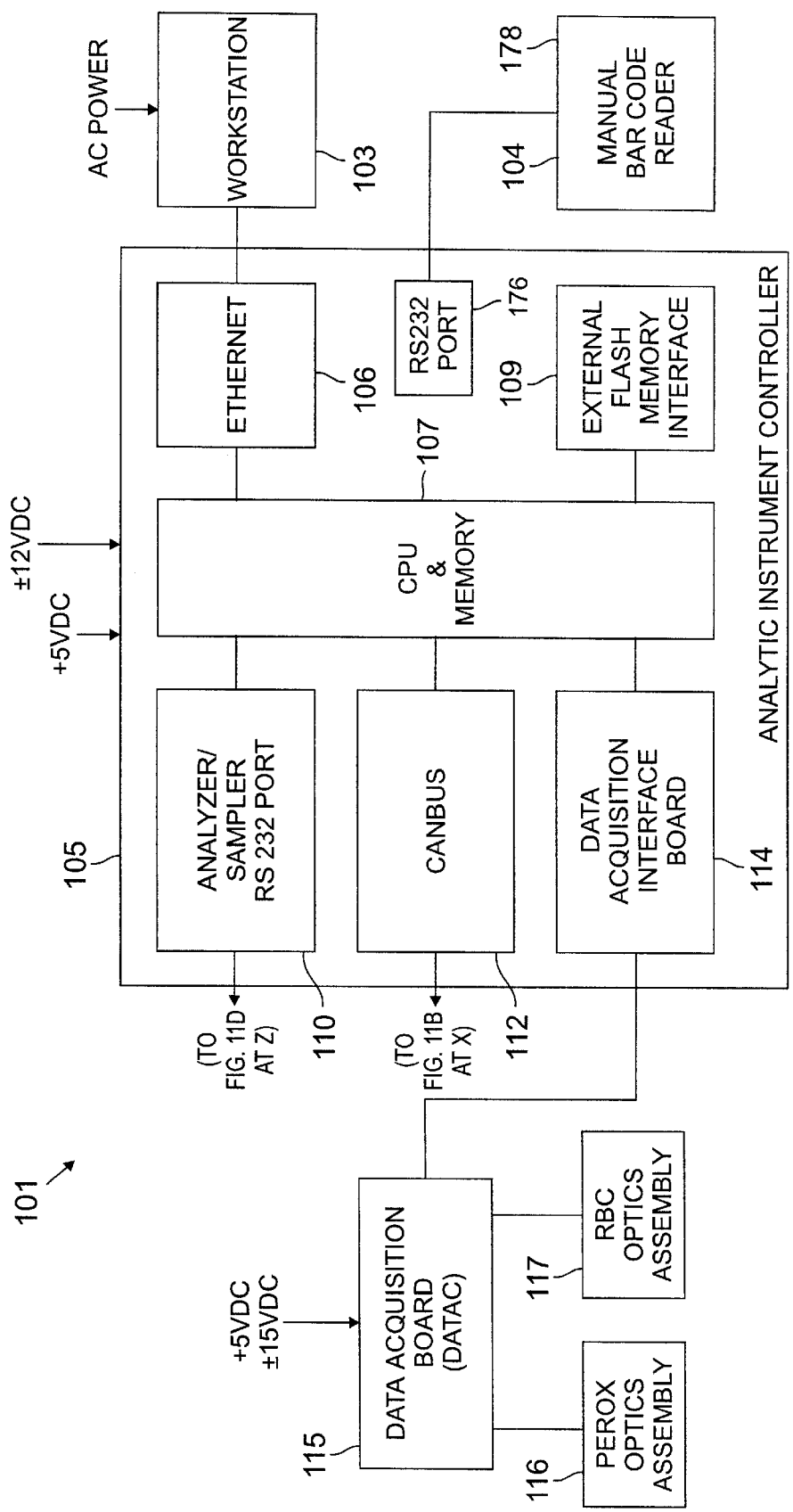
Figure 14B:
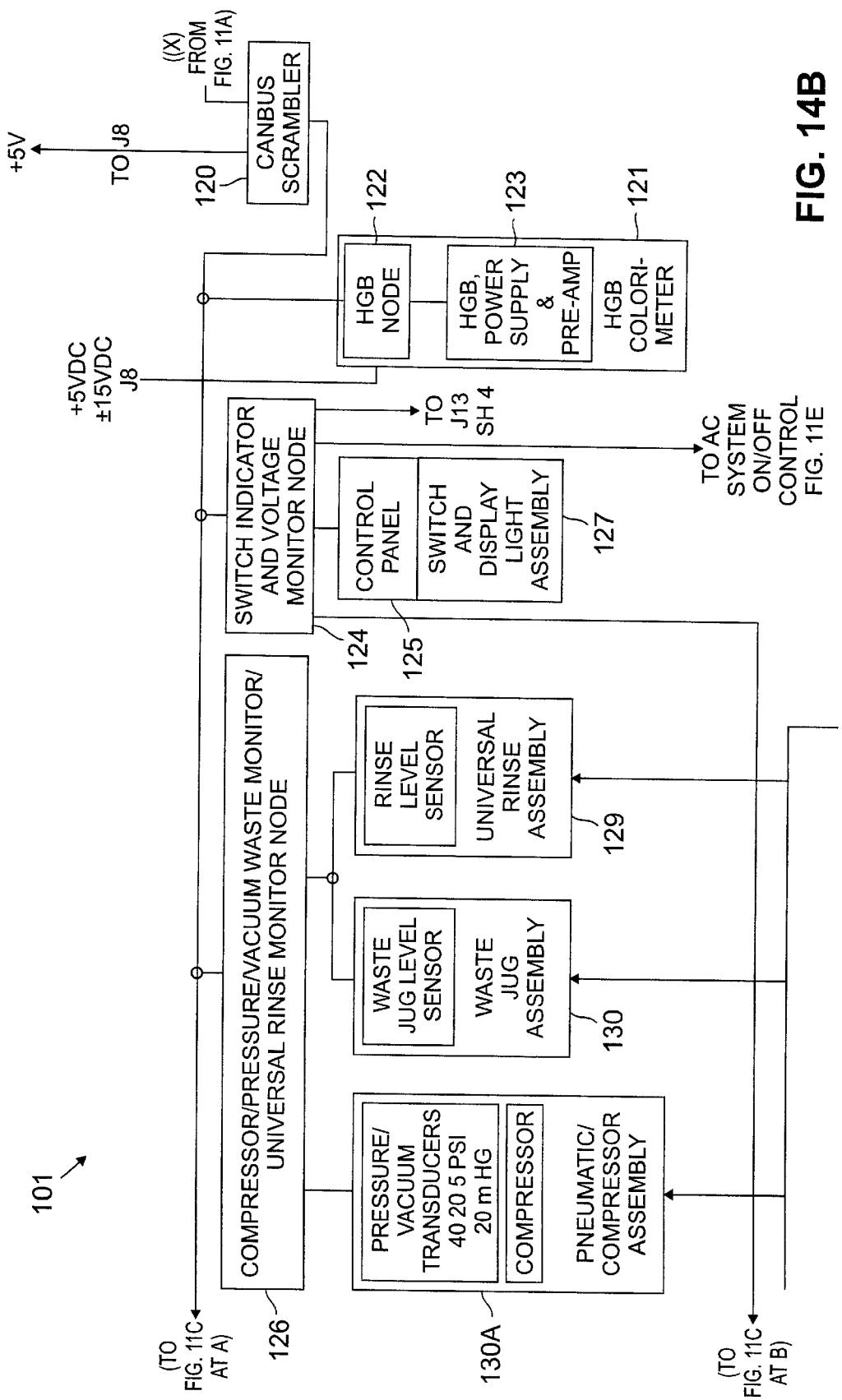
Figure 14D:
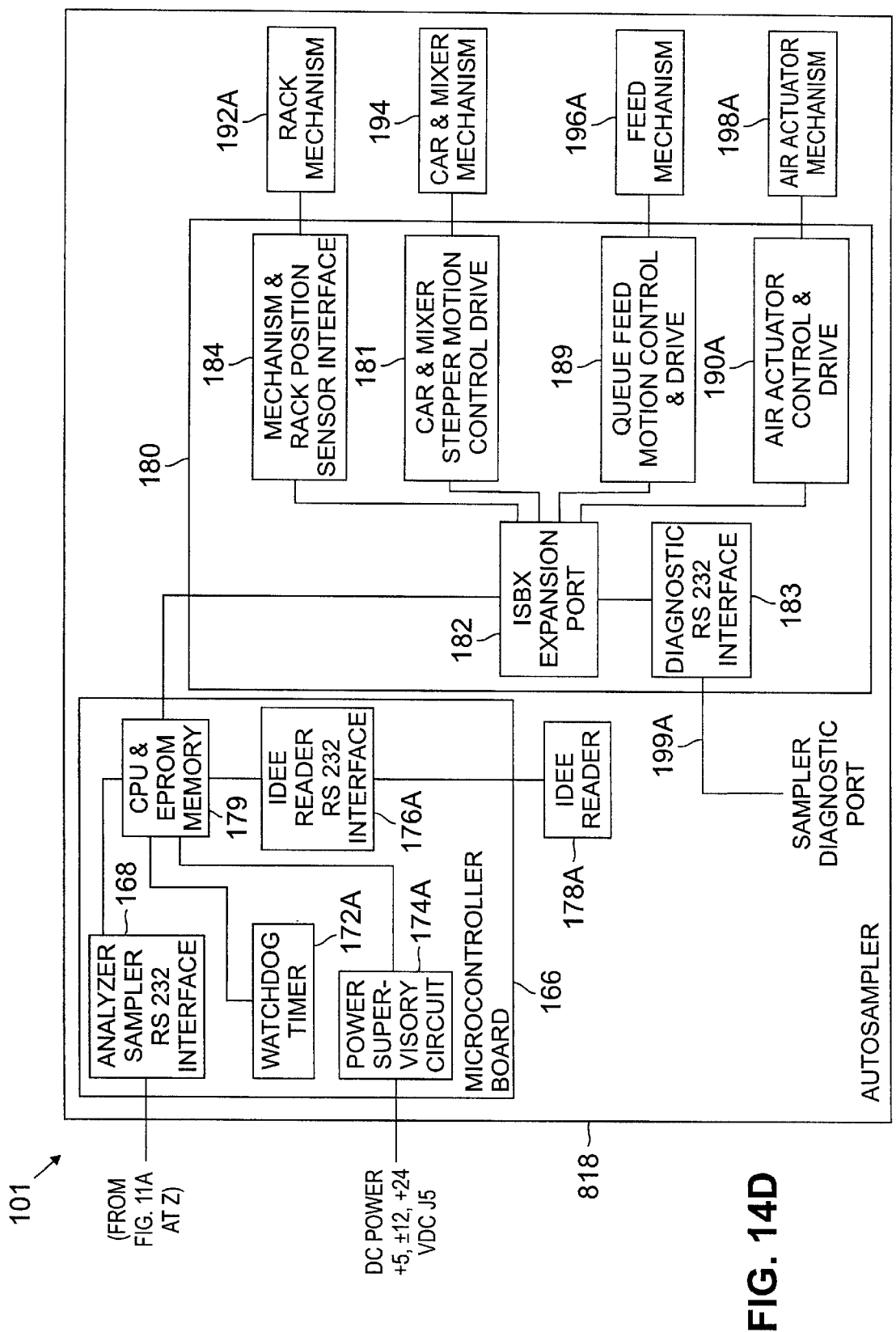
Figure 14E:
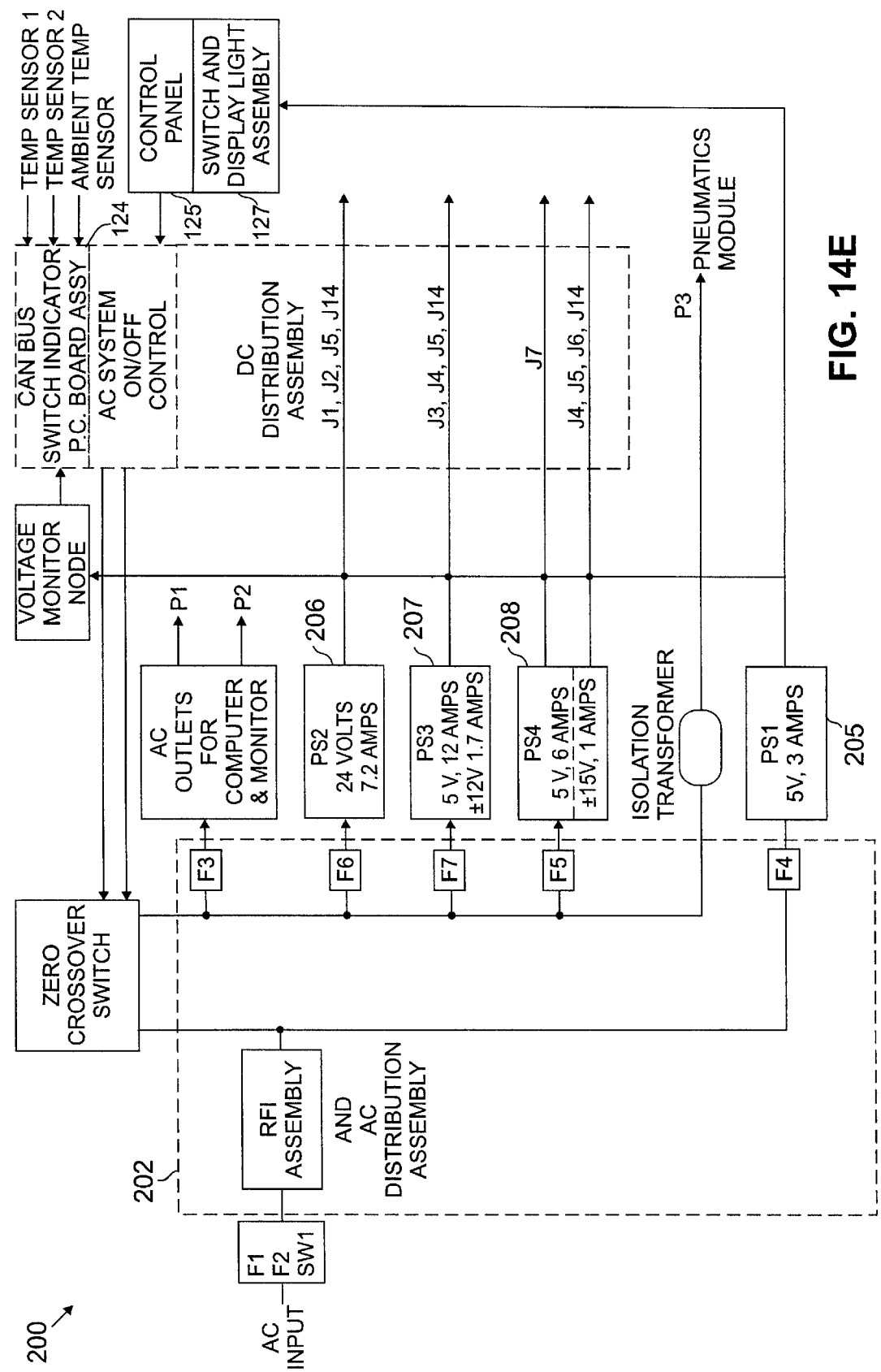

Referring to FIGS. 14B, 7 and 8, calorimeter measurements are taken directly through the acrylic block 506 using a colorimeter assembly 121. The HGB calorimeter includes a reaction chamber 593 in the UFC 502, a light source 622, preferably 3.5 volt tungsten light source, an optical filter 367, and a photodetector 623 mounted on the circuit board 123. The lamp 622 is mounted in a housing 121A, more preferably in a metal casting 121B having fins (not shown) for dissipating heat generated by the lamp 622. The housing 121A is secured to UFC 502, with lamp 622 on one side of reaction chamber 593 and detector 623 on the other side.

Filter 367 is mounted inside housing 350 and operates to filter out effectively all wavelengths except at approximately 546 nanometers. As a result, the light at 546±0.2 nanometers passes through the filter 367. The NIST 930D filter set, absorbing 0.5 A at 546 nanometers, may be used to provide the filtering operation.

An aperture 366 is interposed between the filter 367 and the photodiode 623. Lamp 622 is mounted so that there is a space 353 between the lamp and the reaction chamber 593. An aperture 354 is provided to limit the amount of light passing into the reaction chamber 593.

As is known in hemoglobin calorimeters, the light source is driven by a stable 3.5 volt source. This may be achieved by any conventional circuitry, such as a differential amplifier using feedback. The lamp power supply circuit is preferably also on a circuit board 123, although it alternately may be mounted on a separate board also in housing 121A. Almost any stable power supply circuit may be used. One useful circuit uses a zener diode to provide a floating ground reference voltage, at 5.1V ±10%, a second zener diode to provide a 2.5V reference at its anode, and a potentiometer to provide an adjustable portion of the 2.5V reference to the positive input of a differential amplifier. The potentiometer is used to set the 3.5 volts across the lamp 622. The output of the differential amplifier then drives the lamp 622 through an emitter-follower transistor.

The lamp voltage is then sensed by a second differential amplifier, referenced to the 2.5 volts source anode with a gain of 0.68, and applied to the negative input of the first differential amplifier via a resistor. The result is that the lamp voltage applied to lamp 622 remains at the level which causes the first differential amplifier inputs to be equal. A current sensing resistor and a transistor, coupled to the emitter follower transistor, are used to limit the output current to drive the lamp 622.

In operation, a blood sample to be analyzed and a reagent are injected in sequence into the reaction chamber. The injection causes mixing of the sequentially injected blood sample and reagent in the chamber. After a time period, which allows the reagent and blood sample to react and bubbles to rise out of the optical pathway, an optical absorption measurement is obtained from the photodetector 623.

2. PEROX Optical System

Referring to FIGS. 14A–14D, 9, 10, 11 and 12, the PEROX optical system 116 is illustrated. The PEROX optical system is used in what is now a conventional manner to identify five types of white blood cells. The cell types are eosinophils, neutrophils, lymphocytes, monocytes, and large unstained cells.

The PEROX optical system 116 includes an illuminator assembly 381, a flow cell 110A and an optical detector assembly 394. The illuminator assembly 381 includes a light source 379, preferably a 10 watt tungsten halogen lamp operating at a 5 volt, 2 amp level, and beam optics suitable for focusing a portion of the lamp output onto flow cell 110 A. The illuminator assembly 381 also includes a housing 395, which filters out extraneous light, and a mounting block 380 at the lamp end for containing some of the beam optic components. Light that is emitted by lamp 379 is passed through, in sequence, a condenser lens 382, a precision slit aperture 383, a precision circular aperture 384a, and a projector lens 384 which focuses the beam onto the flow cell 110A to interrogate the sample (the particulate suspension entrained in a sheath flow) passing through the flow path in the flow cell 110A.

Figure 9:
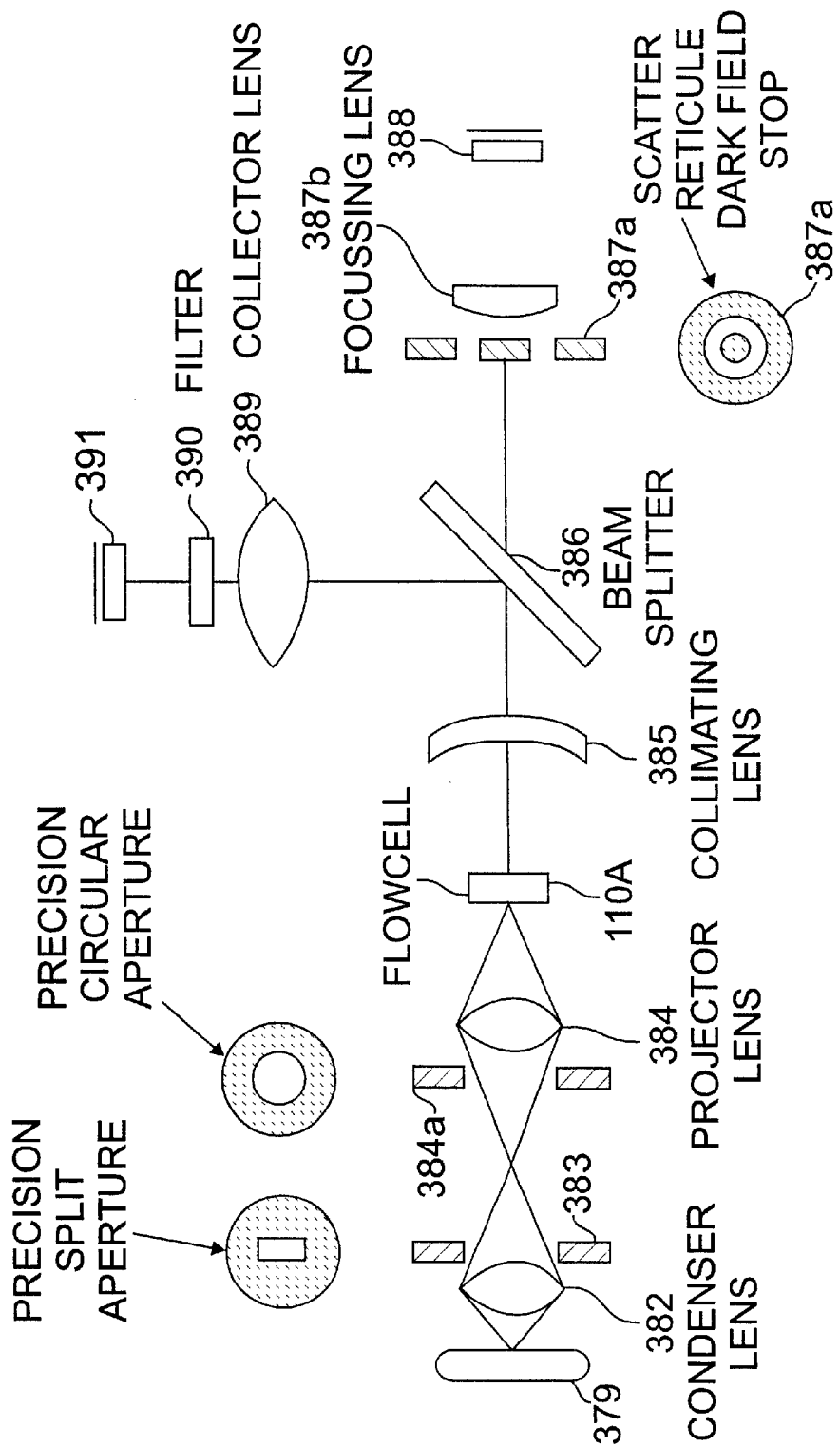

As illustrated in FIG. 9, the precision slit aperture is a rectangular slit having a major axis perpendicular to the flow path. The apertures are positioned so as to shape the beam and eliminate extraneous scattered light. Thus, the shaped beam is passed through the flow cell 110A such that the light is scattered and absorbed by cells passing through the flow cell 110A. Flow cell 110A preferably has the.same construction as described in connection with flow cell 110 of the RBC/PLT optics 117 below. After passing through the flow cell 110A, the passed light is processed by the detector system 394 to obtain a scatter signal 337 and an absorption signal 336 (See FIG. 16). The detector system 394 includes a collimating lens 385 (preferably a 3 lens system having an objective lens 385a, a collecting lens 385b, and a collimating lens 385c). The collimating lens 385 forms a relatively straight collimated beam which is then divided by a beam splitter 386 into two portions. Beam splitter 386 is preferably a partially reflecting mirror which diverts a portion of the light to an absorption leg and passes the remainder to a scatter leg. The scatter leg includes a transparent reticule having an opaque dark field stop in the center to block the main axis beam and an opaque outer portion leaving a transparent annular aperture through which the scattered light passes through to a focusing lens 387b. The focusing lens 387b focuses the scattered light onto a photodetector 388, preferably a pin current photodiode. The absorption leg receives the beam from the beam splitter 386, passes it through a lens 389, which is then passed through a spectral filter 390 to divide spectrum into two parts and passes only the blue light (smaller than 700 nm), and detected by the photodiode 391, preferably a pin current photodiode. The output of photodiode 388, after low-gain preamplification, is the scatter signal 337. The output of photodiode 391, after low-gain preamplification, is the absorption signal 336.

3. Laser Optics and Detection System

Figure 10:
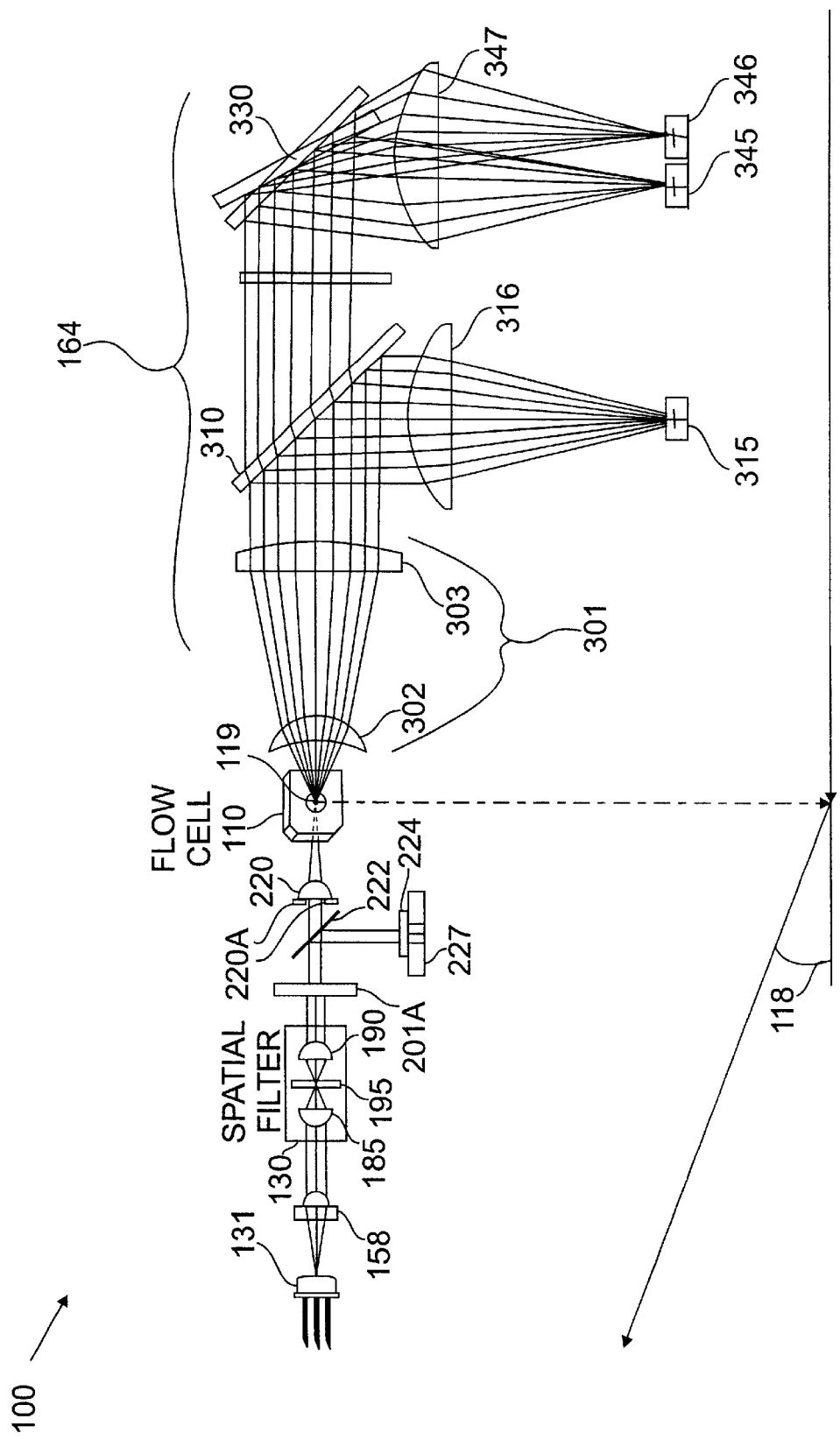
FIG. 10 is a schematic diagram of a laser optical bench and detectors for use in a preferred embodiment of a red and white blood cell analysis channel in a device in accordance with the present invention.

The instrument of the present invention includes a laser optical system for use in the RBC, BASO and RETIC methods. A schematic of the laser optical system is shown in FIG. 10. The optical system 100 comprises a flow cell 110 having a channel through which a thin stream of suspended particles, such as blood cells, is passed for analysis, an illuminator assembly 130 (not shown in detail in FIG. 10) for delivering a filtered, collimated and shaped laser beam B to the flow cell 110, and a detector system 164 for measuring light in response to the beam B being scattered and absorbed by the cells.

The flow cell 110 presents suspended cells or other particles essentially one at a time in a stream positioned for optical access by the illuminator assembly 130 and the detector system 164. The cell suspension is introduced through a nozzle into the center of a laminar flow stream of a sheath liquid. The flow velocity of the sheath liquid is controlled to be greater than the velocity of the introduced cell suspension. This causes the suspension stream to narrow as it accelerates to the velocity of the sheath liquid, as is well known. The suspension stream is further narrowed by passing the sheath liquid containing the cell suspension through a gradually reduced cross sectional area. At the point 119 where the laser beam B is impinged on (i.e., intersects to illuminate or interrogate) the cell suspension stream, the diameter of the stream is on the order of the diameter of a cell, so that two cells cannot easily travel side-by-side in the stream.

At least in the region where the laser beam B is impinged on the cell suspension stream, the flow cell 110 is constructed of an optically transmissive material, preferably glass. The sheath liquid must be optically transmissive as well, in order to permit the laser beam B to travel from the illuminator assembly 130 to and through the cell suspension with adequate intensity to permit the scattered and nonscattered laser light to be detected.

Figure 11:
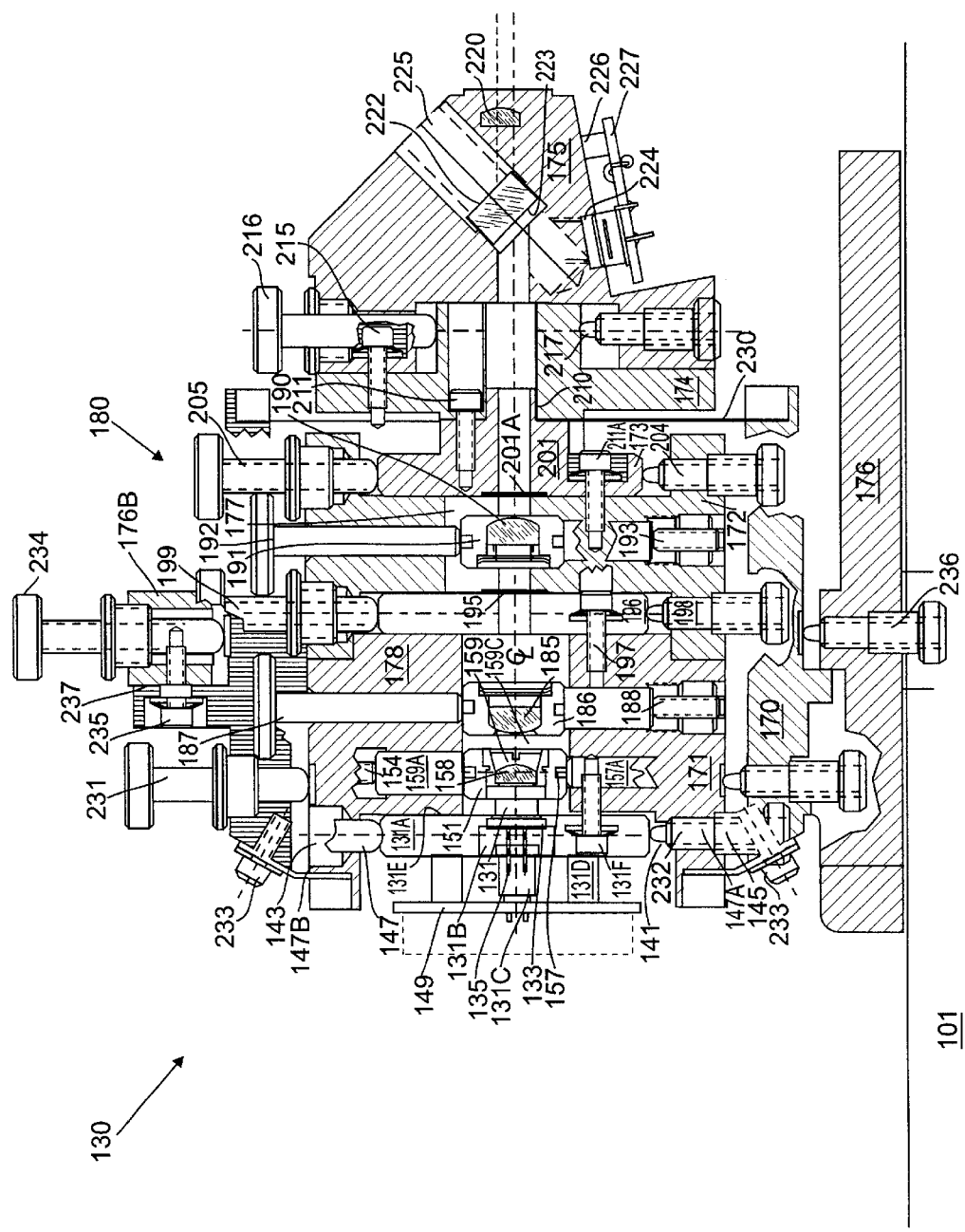
FIG. 11 is a diagram of the illuminator assembly of FIG. 10 in accordance with a first embodiment.

The illuminator assembly 130 of the present invention is shown in FIG. 10 and, in one embodiment, in partial cross section in FIG. 11. It is noted that some of the components used for positioning certain components in a direction perpendicular to the plane of the view of FIG. 11 are illustrated in a position that is rotated 90° from their actual orientation, for clarity of presentation. The illuminator provides a spatially filtered laser image that is focused on the cell stream. The size of the image in a direction parallel to the cell suspension stream is on the order of the diameter of a cell, so that two cells cannot easily pass within the image concurrently.

With reference to the embodiment shown in FIG. 11, the illuminator assembly 130 is constructed in a modular fashion to permit precise, permanent alignment of each optical component as it is installed during assembly. The assembly 130 comprises an illuminator housing 170, and first, second, third, fourth and fifth illuminator optical component carriers 171, 172, 173, 174, 175 mounted as a unit within the illuminator housing. The illuminator housing 170 is mounted within an illuminator mounting ring 176B, which is adjustably mounted to an optical bench 101.

A laser beam source 131 is mounted in a laser source mounting plate 131 A. In a preferred embodiment, the laser beam source is a semiconductor laser device, more preferably, a laser diode, such as a 10 mw, 670 nm, InGaAlP laser diode such as Model No. TOLD-9225(S) manufactured by Toshiba. As illustrated in FIG. 11, the laser diode 131 is mounted in a central bore 133 in the mounting plate 131A, and is retained in the plate by a threaded backing plug 131B. Leads 131G pass from the diode 131 through the backing plug 131B and are connected using a connector 131C to the laser diode driver printed circuit board 149. The printed circuit board 149 is bolted to the back of the laser source mounting plate 131A by mount 131D.

An aspheric collimating lens 158 for collimating the naturally diverging beam emitted by the laser diode 131 is placed in the beam path near the laser diode. The collimating lens 158 is mounted in a bore in a mounting cylinder 151 using a retaining nut 159. The mounting cylinder 151 is placed in a central bore 159C of the first carrier 171. The mounting cylinder 151 fits closely within the central bore 159C so that no further positioning of the collimating lens 158 in the radial direction is required. A focusing tool 157 A is placed in another bore provided in the carrier 171 so that an eccentric engaging pin 157 engages a groove in the periphery of the mounting cylinder 151. The axial position (i.e., in the z direction) of the mounting cylinder 151 in the central bore 159C may be adjusted by rotating the focusing tool 157A in the bore, causing the engaging pin 157 to revolve eccentrically in the groove. After the collimating lens 158 is properly positioned, a locking screw 159B is turned to compress a dowel 159A against the mounting cylinder 151, locking it in place in the bore 159C. After tightening the screw 159B, the focusing tool 157A may be removed and reused in assembling another illuminator assembly.

Optionally, a spatial filter 130 is used to remove unwanted spatial frequencies from the now collimated beam, producing a beam with a Gaussian intensity distribution. The spatial filter comprises an objective lens 185, a collimating lens 190, and a filter aperture plate 195 interposed between the objective and collimating lenses. The objective lens 185 is mounted in a bore in a mounting cylinder 186. The mounting cylinder 186 is positioned and locked in the central bore 159C of the first carrier 171 in the same manner as the mounting cylinder 151, using a focusing tool 187 and locking screw 188.

The second carrier 172 is mounted to the first carrier 171 using bolts (not shown). A pilot shoulder 178 is used to align the first and second carriers. The collimating lens 190 is mounted in a bore in a mounting cylinder 191, which is aligned and locked in the central bore 177 of the second carrier 172 in the same manner as the mounting cylinder 151, using a focusing tool 192 and locking screw 193.

The spatial filter aperture plate 195 is preferably a thin metal disk having a non-reflective coating and a central precision aperture, in this example a rectangle that is approximately 14 $\mu$m×32 $\mu$m. The aperture plate 195 is attached to a mounting plate 196 using an adhesive, preferably an epoxy. The mounting plate 196 is mounted to the first carrier 171 using screws 197 (only one shown). The mounting plate 196 is aligned in the x-y direction in the same manner as the laser mounting plate 131 A, using two pairs of removable micrometer adjusters 199 and spring loaded plungers 198 (only one pair shown), which are mounted in orthogonal axes in the second carrier 172, and which may be removed after tightening the screws 197.

The laser image is then masked by a beam shaping aperture plate 201 A, preferably formed from a thin sheet of metal having a nonreflective coating and an aperture, in this example a rectangle that is approximately 446 $\mu$m×120 $\mu$m. The aperture plate 201A is preferably attached to the third carrier 173 using an adhesive, such as epoxy. The third carrier 173 is mounted to the second carrier 171 using screws 211A (only one shown). The third carrier 173 is aligned in the same manner as the laser mounting plate 131A, using two pairs of removable micrometer adjusters 205 and spring loaded plungers 204 (again, only one pair is shown), which are mounted in the second carrier 172, and which may be removed after tightening the screws 211A. A fourth carrier 174 is aligned to the third carrier 173 using pilot diameter 210, and bolted to the third carrier using bolts 211. Preferably, the spatial filter components are aligned in the x-y directions in an out-of-focus condition. This provides a larger laser beam dimension that makes it easier to align the components than in the case where the spatial filter is focused (adjusted in the z direction) and hence would provide a smaller dimensional beam.

A beam sampler 222 is mounted in an angled bore 225 of the fifth carrier 175. The fifth carrier is mounted to the fourth carrier 174 using screws 215 (only one shown). The fifth carrier 175 is aligned in the same manner as the laser mounting plate 131 A, using two pairs of removable micrometer screws 216 and spring loaded plungers 217, which are orthogonally mounted in the fifth carrier 175 (only one pair is shown), and which may be removed after tightening the screws 215 for reuse.

The beam sampler 222 functions to reflect a portion of the laser beam to obtain a reference beam to monitor its intensity for use by a difference circuit in analyzing the blood cells as described below. The beam sampler 222 has a partially reflective surface 223 for reflecting a portion of the beam onto a reference detector 224, such as a photodiode. In a useful embodiment of the invention, 20% of the beam is reflected. The reference detector is mounted on a reference detector preamp board 227, which is attached to the fifth carrier 175 through mounts 226. The reference detector 224 measures random fluctuations in beam strength inherent in the laser source 131. This information is sampled by the reference detector preamp board 227 and is used to compensate measurements of beam absorption made by the detector system 164.

By sampling the beam after it has been filtered by the spatial filter 130 and clipped by the beam shaping aperture plate 201A, only those random power fluctuations affecting the beam as it is imaged in the flow cell 110 are measured. Fluctuations affecting only those portions of the beam that are filtered or masked by the aperture plates 195, 201A are, therefore, ignored by the difference circuit. This results in a more precise compensation for the absorption measurement.

The remaining portion of the beam is transmitted through the beam sampler 222, and is axially shifted slightly by refraction. The beam passes into an illuminator lens 220, which is mounted in a central bore in the fifth carrier 175. The laser beam image is thus focused by the illuminator lens 220 on the cell suspension stream. A third beam shaping aperture 220A is interposed between lens 220 and beam sampler 222, to shape the laser beam entering lens 220.

A flexure 230 constructed of sheet metal such as spring steel is mounted between the third and fourth carriers 173, 174 and is connected to the illuminator housing 170. The flexure, in conjunction with the micrometer adjuster 231 and spring loaded plunger 232, provide an angular adjustment of the carrier assembly 171–175 with respect to the housing. Turning the micrometer adjuster 231 finely adjusts the angle of the carrier assembly 171–175 as the flexure 230 deflects. After screws 233 are tightened to lock the carrier assembly in place in the housing, the micrometer adjuster 231 and plunger 232 can be removed and reused to assemble another illuminator.

The illuminator housing 170 is mounted to the illuminator mounting ring 176B on an annular face 237. The position of the illuminator housing on the annular face of the illuminator mounting ring is adjusted using micrometer adjuster 234 and plunger 236. The position is locked by screws 235 (one shown), after which the micrometer adjuster and plunger may be removed and reused.

As shown in FIG. 10, after exiting the illuminator assembly 130, the laser beam B is directed on the cell suspension stream at point 119 in the flow cell 110. Preferably, the flow cell 110 is tilted at an angle 118 relative to the plane normal to the axis of laser beam B of 3°–5°, preferably 4°(not shown in FIG. 11). The tilt axis is parallel to the long axis of the beam shaping aperture and perpendicular to both the optical axis and the axis of the flow cell.

After leaving the flow cell 110, the scattered beam enters the detector system 164. The detector system 164, shown cut away in FIG. 11, comprises a 2-element, high numeric aperture (NA) lens 301, a beam splitter 310, an absorption detector 315 with an corresponding imaging lens 316, a dark stop 320, a split mirror 330 and scatter detectors 345, 346 with a corresponding imaging lens 347. Each of the elements are mounted in a cylindrical bore of housing 305 in a predetermined and fixed position.

The high NA lens system 301 collects and collimates the scattered light from the flow cell, forming a circular pattern of parallel rays for segregation by the beam splitter 310 and the dark stop 320. It is important that this lens system have a high numerical aperture in order to collect the scattered beam through a maximum included solid angle subtended about the flow cell 110.

After exiting the second element 303 of the high NA lens 301, the collimated light strikes the beam splitter 310 which is mounted in a fixed angular orientation to the beam axis in a spacer member 310 A. A portion of the light is reflected by the beam splitter 310 and passes through an absorption detector imaging lens 316 mounted to the base 305. The imaging lens 316 focuses the light onto an absorption detector 315. In a currently preferred embodiment of the detector, 50% of the light from the high NA lens is reflected by the beam splitter 310 for use by the absorption channel. The beam splitter 310 also has a 0.5° wedge, which is the measured angle between the front optical surface of splitter 310 and rear optical plane of splitter 310 to reduce interference from reflected beams. Alternately, lens 316 may be mounted in spacer member 310 A in a fixed position relative to beam splitter 310 to provide for an aligned arrangement.

The absorption detector 315 is preferably a photosensitive diode mounted on a detector circuit board 352, which is described further below.

The absorption detector actually measures the unabsorbed light from the flow cell that is collected by the high NA lens. This measurement is affected by random fluctuations in laser power from the laser diode 131 (FIG. 1). The fluctuations are measured by the reference detector 224 are converted to an oscillating electrical signal in the reference diode preamp board 227, and subtracted from the absorption detector signal by a difference circuit on the DATAC board 115 (FIG. 14A). By eliminating the effect of the random power fluctuations from the laser, a cleaner absorption measurement is obtained. Further, because only the masked portion of the beam utilized in the absorption measurement is sampled by the beam sampler 222, the difference circuit subtracts only those random fluctuations in the laser beam that are likely to affect the absorption measurement. More accurate compensation of the measurement results.

The remaining portion of the light collected by the high NA lens 303 is transmitted through the beam splitter 310 for use in the measurement of high and low angle scatter. Because the light has been collimated, the outer portion of the circular pattern comprises light that was scattered at a high angle in the flow cell; the inner portion of the pattern is light scattered at a low angle. These two portions of the scattered light are segregated by the dark stop 320, which is shown in plan view in FIG. 12. The dark stop is preferably constructed from a thin metallic plate having an opaque, non-reflective coating. The dark stop is preferably mounted in the bore of housing 305 against a shoulder at an angle a (FIG. 12) of about 7½°(7.41°) perpendicular to the beam path, in order to reduce interference from ghost reflections back into the optical system and to minimize aberrations from the optical system. Other angles may be used, e.g., an angle between 5° and 10°. In one embodiment, a screw adjustment may be provided to select the angle of the dark stop 320 relative to the shoulder. The dark stop 320 is held in position by spacer members 310A and 320A and retaining washer 302A.

The opaque coating of the dark stop 320 has a plurality of precision shaped apertures that permit light to pass according to its distance from the center of the light pattern. A first aperture 321 permits high-angle scatter, which is typically light scattered between 5° and 15° in the flow cell, to pass. In a preferred embodiment, the first aperture 321 is a sector-shaped aperture bounded by an inner radius of 3.94 mm, an outer radius of 11.57 mm, and extends through an arc of slightly less than 180°. In the remaining half of the dark stop 320, second and third apertures 322, 323 permit low-angle scatter, which is typically scattered between 2° and 3°, to pass. In a preferred embodiment, the second and third apertures 322, 323 are sector-shaped apertures bounded by an inner radius of 1.58 mm, an outer radius of 2.37 mm, and each extends through an arc of slightly less than 90°. The dark stop thus allows only high-angle scatter to pass in one half of the light pattern, and low-angle scatter to pass in the other half.

For ease of alignment, the center of the dark stop 320 may have a hole to allow a portion of the laser beam to pass therethrough and impinge the reflective split mirror 330 for alignment. Once aligned, the hole is occluded during use by a rod inserted between the dark stop and the collecting lens which blocks the beam portion passing through the alignment hole, but which does not block the shaped apertures.

Figure 12:
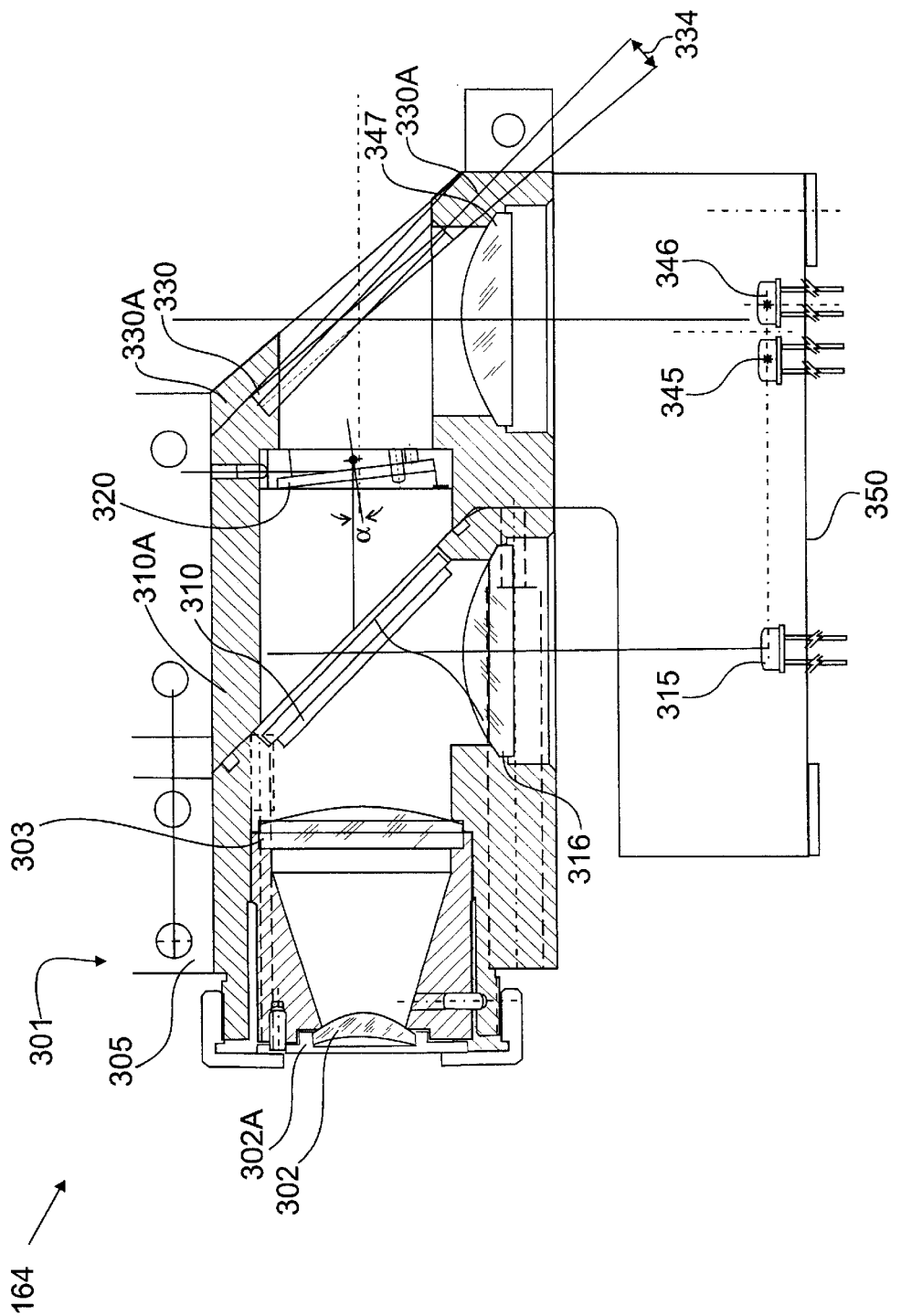
FIG. 12 is a top view of a schematic diagram of the detector system of FIG. 11.
Figure 13:
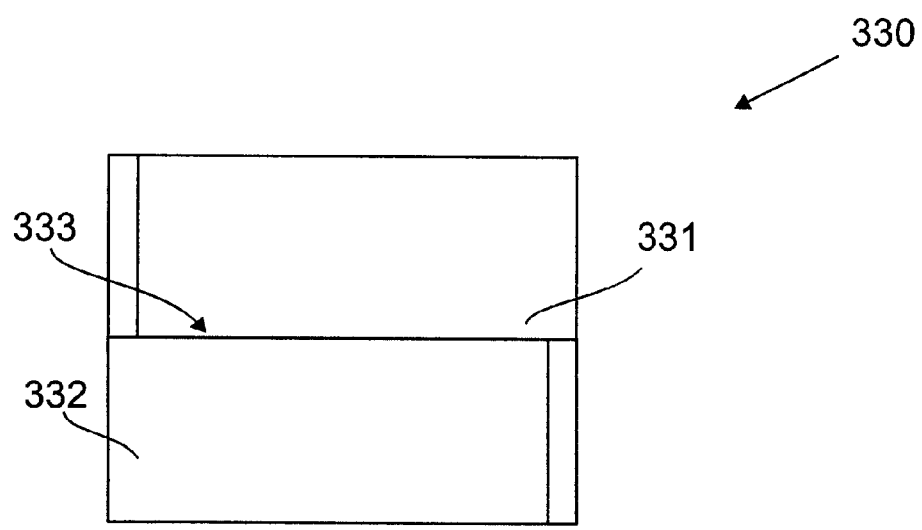
FIG. 13 is a front plane view of the split mirror of FIG. 12.

The light pattern, as masked by the dark stop 320, is transmitted to a split mirror 330 mounted in a housing 330 A which is in turn secured (e.g., bolted) to the base 305. The split mirror comprises two optical flats 331, 332, arranged respectively, above and below the optical axis as shown in FIG. 13. The surfaces of the flats 331, 332 are oriented in different planes having a common axis and an angle of tilt 334 between the planes, as best seen in FIG. 12. In a preferred embodiment, the angle 334 (FIG. 12) between the surfaces 331, 332 is 5½°. The split mirror 330 is mounted in the base 305 so that the edge 333 (see FIG. 12) of the surfaces lies between the high-angle scatter portion of the light pattern and the low angle portion of the light pattern. That is, light passing through the first aperture 321 of the dark stop 320 strikes surface 331, while light passing through the second and third apertures 322, 323 of the dark stop strike a surface 332 of a beam splitter element 330 (see FIG. 13). The high and low angle scatter portions of the light pattern are therefore reflected in diverging directions by the split mirror 330. One useful embodiment uses the high angle scatter mirror 331 above the optical axis at an angle of 40.75° relative to the axis, and the low angle scatter mirror 332 below the optical axis at an angle of 46.25° relative to the beam axis.

As shown in FIG. 12, the high and low angle scatter portions of the light pattern pass through a single scatter detector imaging lens 347. The pattern is focused as two images, one each on a high angle scatter detector 345 and a low angle scatter detector 346. The two portions of the light pattern are sufficiently separated by the split mirror 330 to form two side-by-side images on the two side-by-side detectors 345, 346. This arrangement eliminates an additional imaging lens, beam splitter and dark stop which would otherwise be required to separate the high and low angle scatter portions of the light pattern. Lens 347 also is preferably mounted in housing 330 A. The structure of detector assembly 164, using the precision machined bore in housing 305 and spacer members thus provides a low cost and accurately positioned detector assembly.

The absorption detector 315 and the high and low angle scatter detectors 345, 346 are mounted on a common detector circuit board 352. Use of a common printed circuit board reduces cost by reducing part count and simplifying assembly. Furthermore, alignment of the three detectors, which had previously been done separately, can be done in a single operation by adjusting the position of the common board 352. The relative positions of the three detectors on the common printed circuit board can be maintained with sufficient accuracy to each other using standard PC board assembly techniques.

C. Processing the Raw Data

FIGS. 14A–14E are simplified block diagrams which illustrate the electronics architecture 101 of an embodiment of the invention. In FIG. 14A, a workstation 103 is connected to an analytic instrument controller 105 and also may be connected to various other peripherals such as a printer or modem (not shown). The workstation 103 may also be connected to additional instruments controllers and workstations. It is contemplated that the workstation 103 comprises an IBM-compatible personal computer or equivalent (a WINDOWS 95 or WINDOWS NT brand operating system (Microsoft Trademarks) may be used having a central processing unit at least as powerful as a 486-type microprocessor and adequate memory, a color monitor and a keyboard and mouse for use by an operator. The workstation 103 is preferably connected to an Analytic Instrument Controller 105 via an Ethernet 106.

The Analytic Instrument Controller 105 comprises a 386 CPU and memory 107 connected to the Ethernet 106, to an external flash memory 109, to a manual identification reader device 104, which may be a barcode reader via an RS232 port 176, to an analyzer/sampler RS232 port 110, to a Control Area Network bus (CANBUS) interface 112, and to a Data Acquisition Interface Board (DATAC IB) 114. The DATAC IB 114 is connected to a Data Acquisition Board ("DATAC") 115 which processes signals generated by the peroxidase (Perox) optics assembly 116 and the RBC optics assembly 117.

The CANBUS interface 112 of the Analytic Instrument Controller 105 is connected to a CANBUS scrambler 120 shown in FIG. 14B. The CANBUS scrambler 120 provides the cable connections from the Analytic Instrument Controller 105 to the various nodes, which are explained below. Referring to FIGS. 1B and 1C, it can be seen that the CANBUS connects the Analytic Instrument Controller 105 to a plurality of Nodes. In particular, in FIG. 14B, the CANBUS is connected to the hemoglobin node (HGB node) 122, the Switch Indicator Node 124, and the Pressure and Switch Node 126. The HGB node 122 is part of the HGB calorimeter 121 and is connected to a HBG power supply and pre-amplifier circuit board 123.

Referring to FIG. 14C, the CANBUS is connected to Motor Driver Nodes 132, 134, 136 and 138, which are connected to the RBC Optics sample pump 133, RBC Optics sheath pump 135, PEROX sample pump 137 and PEROX sheath pump 139 respectively. The CANBUS is also connected to the Parallel Node 140, which is connected to the Aspirate and Selector Valve assembly 142, the sample Shear Valve assembly 144, the PEROX reaction chamber assembly 146, and the BASO reaction chamber assembly 148. The CANBUS is also connected to two Valve Driver Nodes 150, 160. The first Valve Driver Node (node 1) 150 is connected through a scrambler 151A to the various components comprising the Unified Fluid Circuit (UFC) which is discussed elsewhere, including the sample shear valve 152, the Unified Flow Circuit Assembly 153, the Conductivity Detector 154, the PEROX heater 155 and the BASO heater 156. The second Valve Driver Node (node 2) 160 is connected through scrambler 161A to several valves located in both the RBC Optics assembly 117 and the PEROX Optics assembly 116. In addition, the second valve driver node 160 is connected through scrambler 162 to a plurality of valves in the Pneumatic Control Assembly 163.

Now that an overview of the electronics architecture of the apparatus has been presented, detailed descriptions of certain components follow.

1. The Workstation

Figure 15:
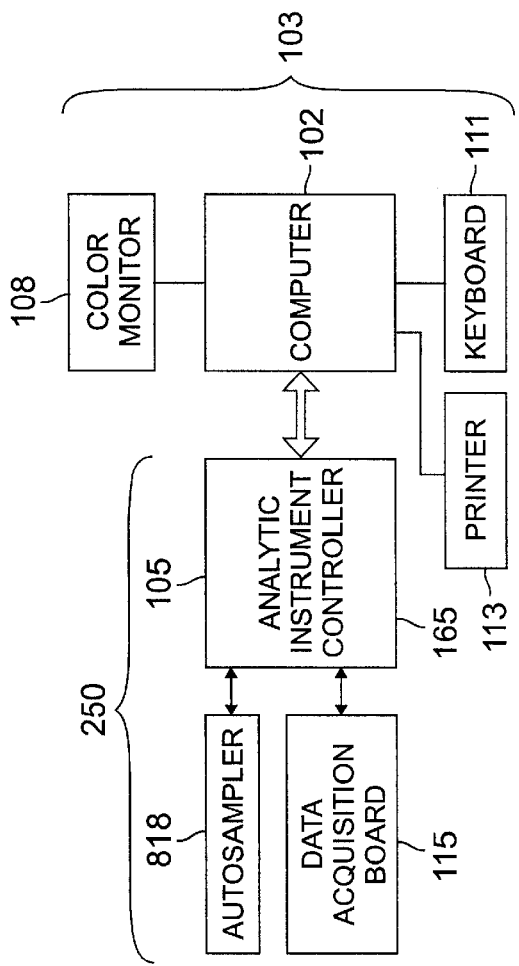
FIG. 15 is a block diagram of the two major computer subsystems of the architecture of FIG. 14A–14E.

FIG. 15 is a simplified block diagram of the two major subsystems, the Analytical Subsystem 250 and the Workstation Subsystem 103. The Workstation 103 comprises an IBM compatible PC 102 having a color monitor 108 and keyboard 111, which is connected to a printer 113 and to the Analytic Instrument Controller 105 via an Ethernet connection using the TCP/IP protocol. The workstation may have floppy, hard disk and CD-ROM drives, and a mouse. The Analytical Subsystem 250 comprises the Analytic Instrument Controller 105, the Autosampler 165 and the Data Acquisition board 115.

The Workstation 103 contains software to initiate testing of blood samples, process the resulting test data and graphically present the results. It also may be coupled to a network for interworkstation communications. The software to enable the electronic circuitry and the electromechanical devices of the submodule 250, to analyze samples and generate test data to be processed, may be downloaded from workstation 103.

Regarding the analytical submodule 250, it is a collection of hardware and software that together control and monitor the hydraulic hardware, the sampler 818 and communicate with an instrument workstation 103. The controller 105 executes a software routine on, e.g., an Intel 386 ex processor. The architecture also includes an Ethernet and control area network (CAN) cards, a PC104 bus, the DATAC board 115 and the "NUCLEUS PLUS" RTOS, which is available from Accelerated Technology Inc. A "loose" coupling mechanism is employed in the analytical submodule software architecture to provide greater maintainability, portability and extensibility. IPC mechanisms are the only coupling between modules. In general, processes will block waiting for input. This input can come from the CANBUS, autosampler 818, the workstation 103, the barcode reader 178, 104, or from the expiration of internal timers.

Some of the conventional functions that might reside in the system controller 105 e.g., reset functions, and responding to operator input selections on the instrument control panel 125 to run one or a series of tests, can be off loaded to the workstation to minimize the computational burden on the analytic controller 105. Thus, the workstation 103 may be a more powerful machine, such as a 486 DX 66 MHz CPU or a Pentium class CPU. In this context, the workstation PC 103 can be configured to execute a "start-up" procedure which launches all required system-critical processes, initializes key system attributes, presents the main system menus on the workstation display (thus avoiding the need for a dedicated display for the system controller 105), provides a clean system shutdown, allows for the ability to configure system initialization in terms of: (i) on-line (connected to an instrument) or off-line operation (e.g., operating on data on a disk); (ii) selecting the system critical modules to launch at startup; and (iii) selecting other modules to launch at start-up.

The workstation also carries out all processing required on the raw digital data received from the analytic instrument controller 105 DATAC 115, and completes all required data analysis, determined by the sample analytical mode, e.g., CBC, CBC/DIFF, etc. Thus, the workstation 103 stores, preferably in compressed form, the raw data as it was received, issues the analytical results to a "results" storage mechanism (memory, Floppy, paper printout) and issues the analytical results to a Run Screen (visual display). Preferably, the workstation also contains data management processing software for operating on the acquired data post-acquisition.

At the start of a series of tests as initiated by the workstation 103, the System CPU 107 generates the commands to the various Nodes to acquire the raw data from the red blood cell (RBC) and platelet (PLT) (collectively, RBC/PLT), reticulocyte (RETIC), Hemoglobin (HGB), Peroxidase (PEROX) and Basophil (BASO) channels.

As the RBC/PLT and hemoglobin data are acquired they are converted from analog to digital form and loaded into a buffer in the System CPU 107. The raw digitized data are checked for validity and, if valid, transferred to the workstation 103 for processing. At the end of the data acquisition period, the accumulated RBC/PLT and HGB data are analyzed by the workstation by the RBC/PLT, hemoglobin analysis program to calculate the RBC parameters and the platelet PLT and hemoglobin HGB parameters, and to generate the thresholds and graphics for the RBC Cytogram and the graphics for the RBC Volume and PLT histograms.

Similarly, at the end of the PEROX data acquisition period, the valid perox data transferred to the workstation are analyzed in the workstation by the white blood cell (WBC) analysis program to calculate the WBC parameters, and to generate the thresholds and graphics for the PEROX cytogram. The data from the Basophil channel transmitted to the workstation are analyzed after the peroxidase channel data by the WBC analysis program. As in the other two channels, the Basophil data is calculated and reported. The Lobularity Index is also calculated and reported, and the thresholds and graphics for the BASO/Lobularity cytogram are generated.

Reticulocyte samples also are automatically analyzed after being transmitted to the workstation. As the reticulocyte data are acquired, they are converted from the analog to digital form and loaded into a buffer and, if determined valid, transmitted to the workstation and stored. At the end of the data acquisition period, the reticulocyte data transmitted to the workstation are analyzed by a RETIC analysis program to generate histograms, cytograms and thresholds, which are used to determine the percentage of reticulocytes.

The color monitor 108 used by the system accepts screen data from the workstation 103. The printer 113 is able to print out screen data and graphics, for example, test results, statistical data, and graphics (cytograms, histograms), preferably in multiple colors.

It should be understood that the functions of the workstation could be integrated into the system controller 105, although this is not believed to be desirable given the current state of data processing technology and power.

2. The Data Accuisition Board

The DATAC board 115 shown in FIG. 14A processes signals generated from the flow cytometric light scattering tests to measure red cell count, volume and hemoglobin content, platelet count and volume. As explained briefly below, cell volumes and hemoglobin content are determined using high angle and low angle light scattering techniques. The signals generated from such tests are processed and then may be displayed on a monitor screen of the workstation 103 for review by an operator, or printed out on a printer.

In particular, data are collected by the DATAC 115 for the low angle low gain, high angle low gain, and absorption signals for each of a large number of cells comprising the sample set. A reticulocyte cytogram before pseudo-absorption correction is generated using the high angle scatter and absorption data. An RBC cytogram is generated using the high angle scatter and low angle scatter data.

The Volume (V) and Hemoglobin Concentration (HC) is then calculated cell by cell using the low angle scatter and high angle scatter data. The values found for V and HC are used to calculate the pseudo-absorption for each cell. The new cell data are used to regenerate the reticulocyte cytogram.

The reticulocyte threshold, the upper coincidence threshold and the lower platelet threshold are calculated using high angle and absorption histograms. The RBC, reticulocytes and outliers are separated using software and threshold settings.

The system typically reports only the percentage of reticulocytes. The absolute reticulocyte count is found by matching sample IDEE (i.e., bar code) numbers and multiplying the percent reticulocyte count by the RBC count found in the autocytochemistry results. These calculations are performed by the workstation 103 based on the data provided by DATAC 115.

In an alternative embodiment, the absolute reticulocyte count is found on the RETIC channel when the System CPU 107 commands the various nodes to acquire raw data as previously discussed.

Figure 16:
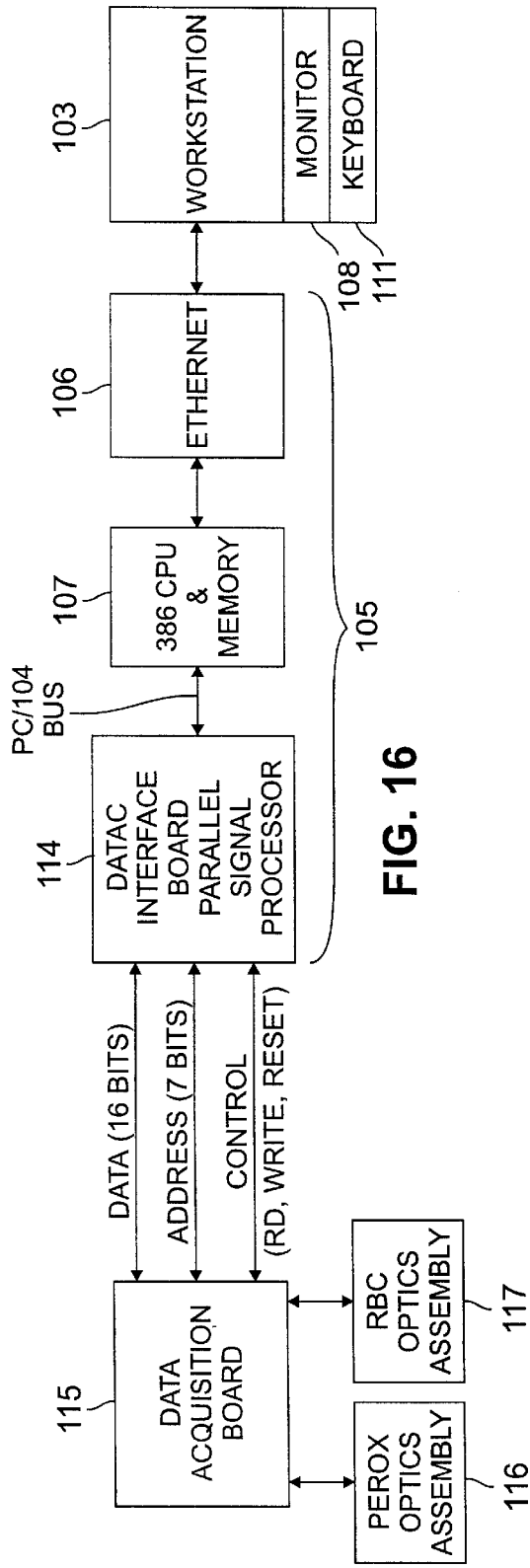
FIG. 16 is a block schematic diagram of the input and output connection of the Data Acquisition Board of FIG. 14A.

FIG. 16 is a simplified block diagram of the input and output connections of the DATAC 115 of the invention. In particular, the DATAC 115 receives blood test data in the form of analog signals from both the Peroxidase Optics assembly 116 and the RBC Optics assembly 117. These analog signals are received at the DATAC 115 where, when appropriate, they are conditioned, amplified, digitized and fed into a buffer for data collection.

The DATAC 115 is connected to the Data Acquisition Interface Board ("DATAC IB") 114 of the Analytic Instrument Controller 105 via a 50 pin ribbon cable. DATAC IB 114 has a PC/104 parallel bus which is compatible with PC/AT system architecture and is mapped into the standard DOS I/O address space (OH-03FFH). Sixteen bi-directional data lines, seven address lines and I/O Read, I/O Write and Reset control lines are provided between the DATAC board 115 and the DATAC IB 114. The typical transfer rate to pass digital cell information to the System CPU 107 via the DATAC IB PC/ 104 parallel bus is 80K bytes per second.

The DATAC 115 performs signal amplification, analog and digital processing and test or diagnostic functions. The DATAC 115 is preferably embodied in a board utilizing hybrid circuits and field programmable gate arrays (FPGAs) which convert analog inputs into digital outputs for further processing. Such circuitry reduces the size of the board by combining discrete digital control circuit functions into single component blocks. In addition, cabling requirements are reduced, and modular testable blocks and test injection ports are provided.

Figure 17:
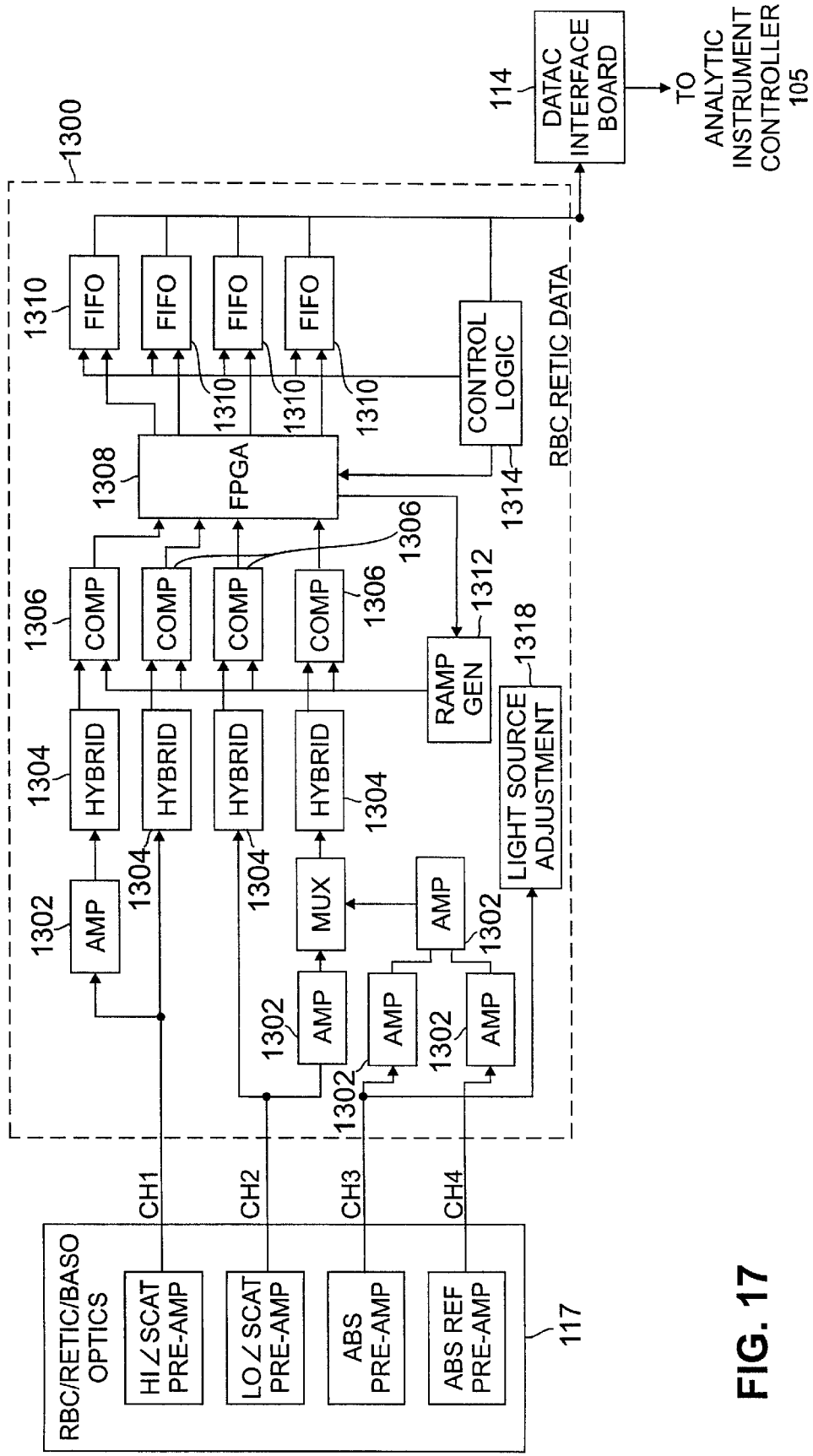
FIG. 17 is a schematic block circuit diagram of the Data Acquisition Board of FIG. 16.
Figure 18:
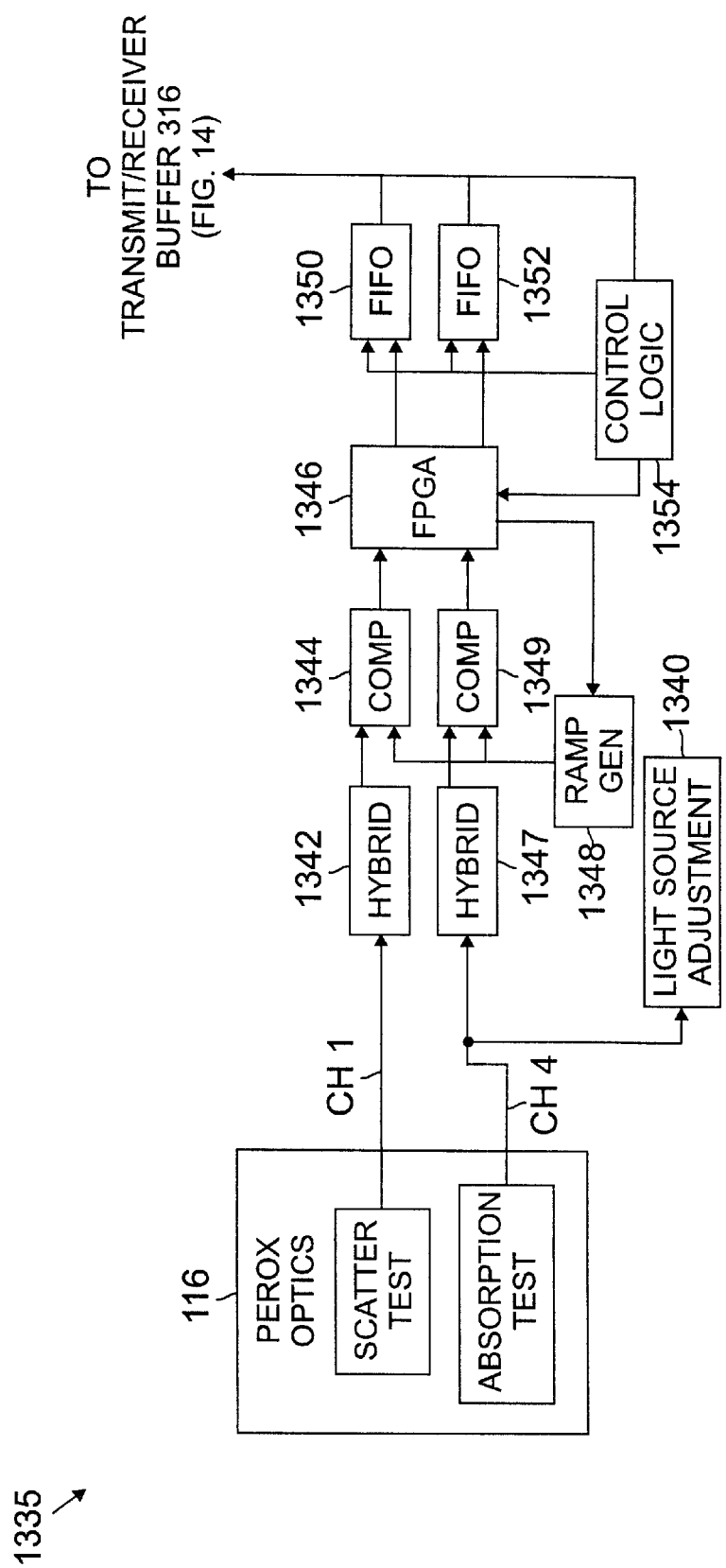
FIG. 18 is a block schematic diagram of the Peroxidase Analog channel of the apparatus of FIG. 16.

FIG. 17 is a simplified block diagram of a portion of the DATAC 115 circuitry that is used for processing the signals and providing output concerning the RBC/RETIC and BASO blood tests performed by the apparatus. An optical bench 117 provides analog blood test signals from the laser diode 131 (not shown in FIG. 17) over four channels. The signal pulses provided by the four channels are, respectively, an Absorption reference (AR) signal (Channel 4), a Scatter Low Angle (SLA) signal (Channel 2), a Scatter High Angle (SHA) signal (Channel 1), and a RETIC Absorption (RA) signal (Channel 3). The circuitry demarcated by dotted line 1300 processes the analog signals from the four channels to produce the RBC and RETIC blood analysis results. The analog signals, which are low gain signals as discussed below, are input to amplifiers 1302, then into hybrid circuits 1304, comparators 1306 and FPGA 1308 for RBC/RETIC blood analysis processing. The hybrid circuits 1304 include analog divider circuitry, analog gain control circuitry, variable gain amplifiers, DC restoration amplifiers and peak-detecting circuitry. The analog gain control circuitry is used in part to nullify variations in the energy of the optical channel illumination source using a ratio of the analog signals received from amplifiers 1302 and the desired energy level. It should be understood that the hybrids 1304 may actually include the comparator 1306 (shown separately in FIG. 17 for clarity) and perform the digital conversion of the peak-detected analog signal under the control of the FPGA 1308 and in response to the ramp generator 1312, as described in further detail below. FPGA 1308 includes logic sequencer circuitry, pulse height analyzer circuitry and control logic circuitry to calculate variables such as cell dead time and valid cell count. Some general background on the red blood cell (RBC) and reticulocyte (RETIC) blood tests follows immediately below.

Reticulocytes are immature red blood cells that still contain RNA. They are often larger than mature red blood cells (RBCs). In the present invention, reticulocyte samples are chemically treated with a reagent on-line in a RBC channel. The reticulocyte reagent volumetrically spheres all RBCs and then stains the RNA in the reticulocytes. See commonly owned U.S. Pat. No. 5,350,695 (Collella et al.) which describes a suitable reagent and methodology permitting the on-line incubation and which is incorporated herein by reference. Reticulocytes are determined in two phases. Phase one is by measuring the light absorption of the cells and phase two is by software which discriminates between RBCs and reticulocytes.

The RBCs and reticulocytes that pass through the flow cell 110 (not shown in FIG. 17) scatter light at low and high angles, and the stained reticulocytes also absorb a percentage of the light. The scattered light signals are detected by photodiodes on a single printed circuit board. The percentage of light absorbed, and light scattered at too great of an angle for the optics to collect (pseudo-absorption) are detected by an RETIC Absorption photodiode as described elsewhere herein.

Referring again to FIG. 17, the signal amplitude in the scatter low angle low gain channel (channel 2) must be greater than 0.6 volts to be considered a valid cell. If the signal from the low angle low gain channel 2 meets the first criteria for a valid cell, it is checked again in FPGA circuit 308 to determine if the pulse width is between 2–80 microseconds. A ramp generator 1312 provides a ramp signal, as part of the digital conversion process, for ten microseconds to convert simultaneously the four peak detected signals. If the pulse width is within the specified limits, and the first criterion is also true, then the signal is classified as a valid cell signal and the resultant analog signals produced by channels 1, 2, 3 and 4 for the same cell-laser beam interaction are converted to digital words and stored in FIFO buffers 1310. A control logic circuit 1314 controls the release of data from the FIFOs 1310 to the analytic instrument controller 105 via the DATAC IB 114 (see FIG. 14A). Light source adjustment circuit 1318 provides a constant gain setting to the denominator of the analog divider inside the hybrids 1304 so that any change in the light source is equally experienced by the numerator and denominator of the hybrid divider(s), and therefore provides a normal cell pulse signal from the dividers. More generally, it provides for computer setting of the automatic gain control voltage to the hybrids 1304. It is noted that one of the achievements of the DATAC 115 is that the use of potentiometers and other devices requiring manual adjustment for calibration the electronics, which are used in prior art instruments, are avoided.

During the RBC/RETIC testing period, a computer program performs coincidence correction to trim and transform the cytogram data into RBC volume and hemoglobin concentration histograms. The high angle, high gain data are used to form a platelet volume histogram. The histograms are used to calculate cell size parameters. The RBC/RETIC ratio, together with the dead time and valid cell counts, are used to calculate the percent RETIC count and RETIC indices. After the test signals are processed, an operator can view all the blood test results on the monitor of workstation 103.

FIG. 17 also depicts the BASO blood test signal acquisition circuitry which processes the signals from channels 1 and 2. The separation of the baso/lobularity cytogram into distinct clusters is performed by software and fixed thresholds. The Basophils are relatively large and scatter more light in the direction of the low angle scatter detector. The polymorphonuclear (PMNS) separate from the mononuclear (MNs) cells by scattering more light in the direction of high angle scatter detector. The ratio of PMNs and Mns are used in a Lobularity Index (LI). In particular, the SHA and SLA signals are input to their respective hybrid circuits 1304, and then into comparators 1306 and FPGA 1308 as previously described, but used in this case for the BASO processing. The data from the other channels 3 and 4 are not used in the BASO determination. A feedback signal from FPGA 1308 through ramp generator 1312 is used by the comparators 1306 for the digitization. The signal amplitude of the SHA, scatter high angle gain signal (channel 1), must be greater than 0.6 volts to be considered a valid cell. If the SHA signal from channel 1 meets the first criteria for a valid cell, it is checked again in FPGA 1308 to determine if the pulse width is between 2–80 μsec. If the pulse width is within the specified limits, and the amplitude is greater than 0.6 volts, then the signal is classified as a valid cell signal and the analog signals are peak-detected and converted to digital words and stored in the corresponding FIFO buffers 1310.

Control logic circuit 1314 controls the release of data from the FIFOs 1310 to the analytical instrument controller 105 via the DATAC IB 114. The data collected from the low and high angle detectors are then used to form a cytogram, which can be viewed by an operator at the workstation 103. Preferably, BASO signal acquisition circuitry is on the same printed circuit board as the RBC/RETIC circuitry 1300. However, a separate circuit board with a parallel set of hybrid and FPGA circuits also could be used.

Figure 19:
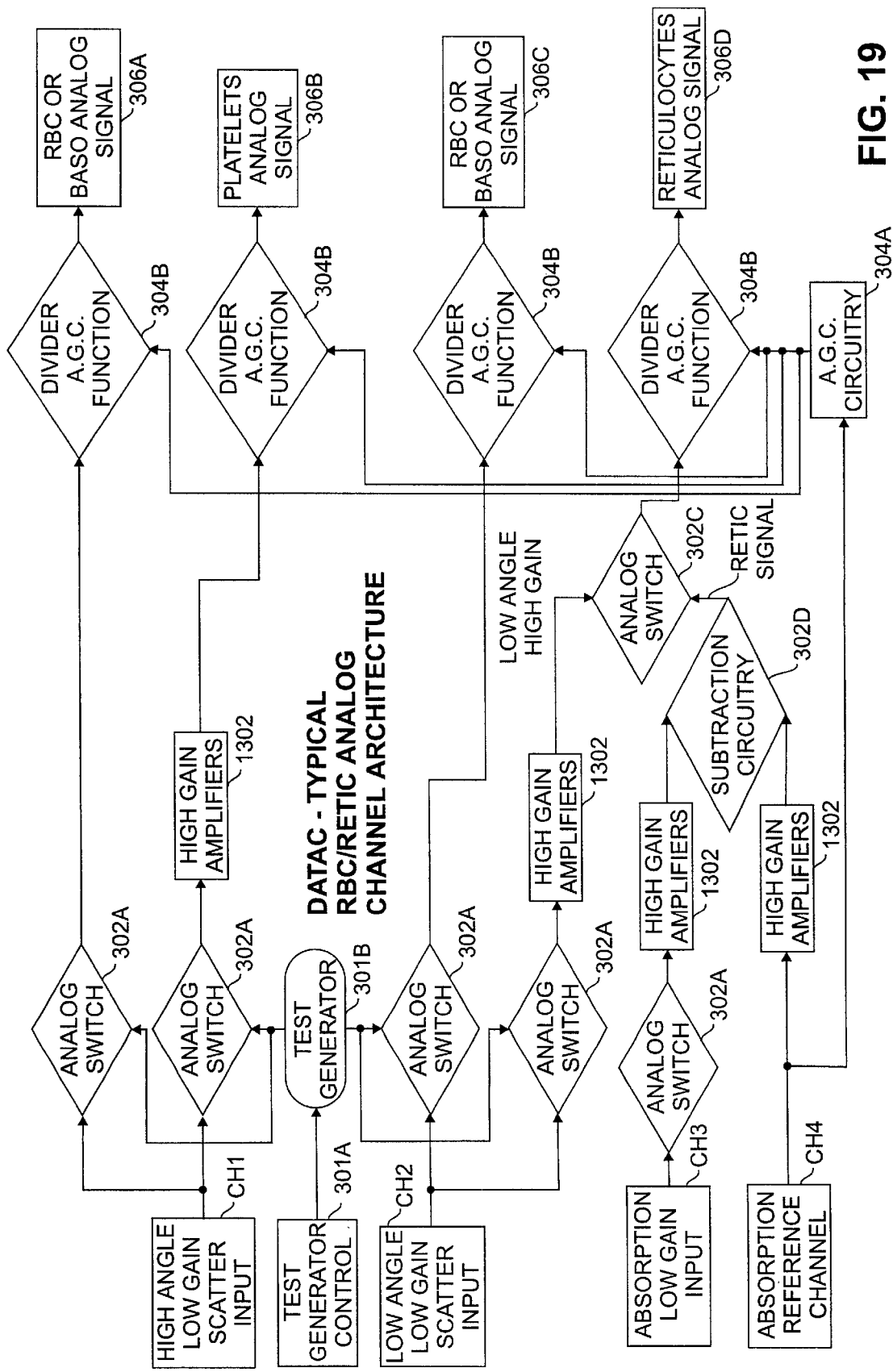
FIG. 19 is a functional schematic diagram of a portion of the Data Acquisition Board of FIG. 17.

Referring to FIG. 19, a functional schematic drawing of the input section of DATAC 115 including the hybrids 1304 of FIG. 17 is shown. Each input channel is provided with an automatic gain control circuit 304*b* which typically performs a divider operation on the analog signal. The magnitude of the division function is controlled by a master gain control circuit 304*a*. Other automatic gain control circuits may also be used. The analog switches 302*a* are used to control the selection and direction of the four possible low gain input signals through DATAC 115 for deriving the different output analog signals to be input to the four comparators 1306, as follows: the high angle scatter RBC or BASO analog signal to comparator 306*a*, the platelet analog signal to comparator 306*b*, the low angle scatter RBC or BASO analog signal to comparator 306*c* and the RETIC analog signal to comparator 306*d*. Although not shown in FIGS. 19 or 20, a D.C. voltage restoration circuit for each a.c. coupled analog signal is used, preferably at the input to the comparators 1306. See, e.g., the similar circuits in the PEROX signal processing circuits in FIG. 20.

Subtraction circuitry 302*d* is used to derive the RETIC signal using conventional differential subtraction techniques, as are well known. Analog switch 302*c* is used to select passage of one of the low angle high gain signal and the RETIC signal through the corresponding divider circuit 304*b*.

The test generator control circuit 301 a is used to operate the test generator circuit 301*b*, which produces predetermined valid analog signals into the DATAC 115 inputs (bypassing only the photodetectors), to perform diagnostic and troubleshooting tests on the data acquisition and signal processing equipment. This on-board test signal injection uses known pulse width, pulse height and duty cycle signals to test the system integrity and diagnose malfunctions, as well as to calibrate the instrument automatically. For example, the system controller 105 or the workstation 103 can be programmed to perform maintenance checks on the electronics at particular times or time intervals, e.g., start up or reset, to actuate the test generator control circuit 301*a* and appropriate analog switches to verify proper operation. Preferably, it also can be "manually" activated, for example, during a field service inspection or operator initiation. In this regard, the test signal amplitude can be used to conduct unsaturated testing of all analog system components. Further, synchronization of test signals allows digitizing, counting and displaying pulse pairs on a monitor. The test system is disabled during normal operation.

FIG. 16 is a simplified block diagram of a Peroxidase Analog channel architecture 1335. The PEROX Optics Assembly 116 generates two signals, a low gain scatter signal CH1 and high gain absorption signal CH4, which are input to hybrids 1342 and 1347, respectively. The high gain scatter signal from channel 1 is passed to a hybrid amplifier 338, is fed to a hybrid circuit 1342, then to comparator 1344 and into FPGA circuit 1346. Similarly, the high gain absorption signal from channel 4 is fed to hybrid circuit 1347, then to comparator 1349 and into FPGA circuit 1346. The comparators 1344 and 1349 each have a second input from ramp generator 1348, which is controlled by the FPGA circuit 1346. During the PEROX analysis period, the signal amplitude in the scatter channel must be greater than 0.6 volts to be considered a valid cell signal. As in the RBC/PLT, RETIC and BASO data acquisition channels, the signal is checked again to determine if it meets the valid cell criteria of a pulse width between 2–80 μsec. If it does, the analog pulses in the scatter and absorption channels (X and Y) are peak-detected, converted into digital words and stored in FIFO buffers 1350 and 1352. The control logic circuit 354 controls the release of the data signals stored in the FIFOs to the analytic instrument controller 105, as shown in FIG. 17, which are then used to form a PEROX cytogram. The signal pulses in the scatter channel are also measured by a dead time counter and the pulse widths are checked to determine if the signals should be counted by the valid cell counter.

Figure 20:
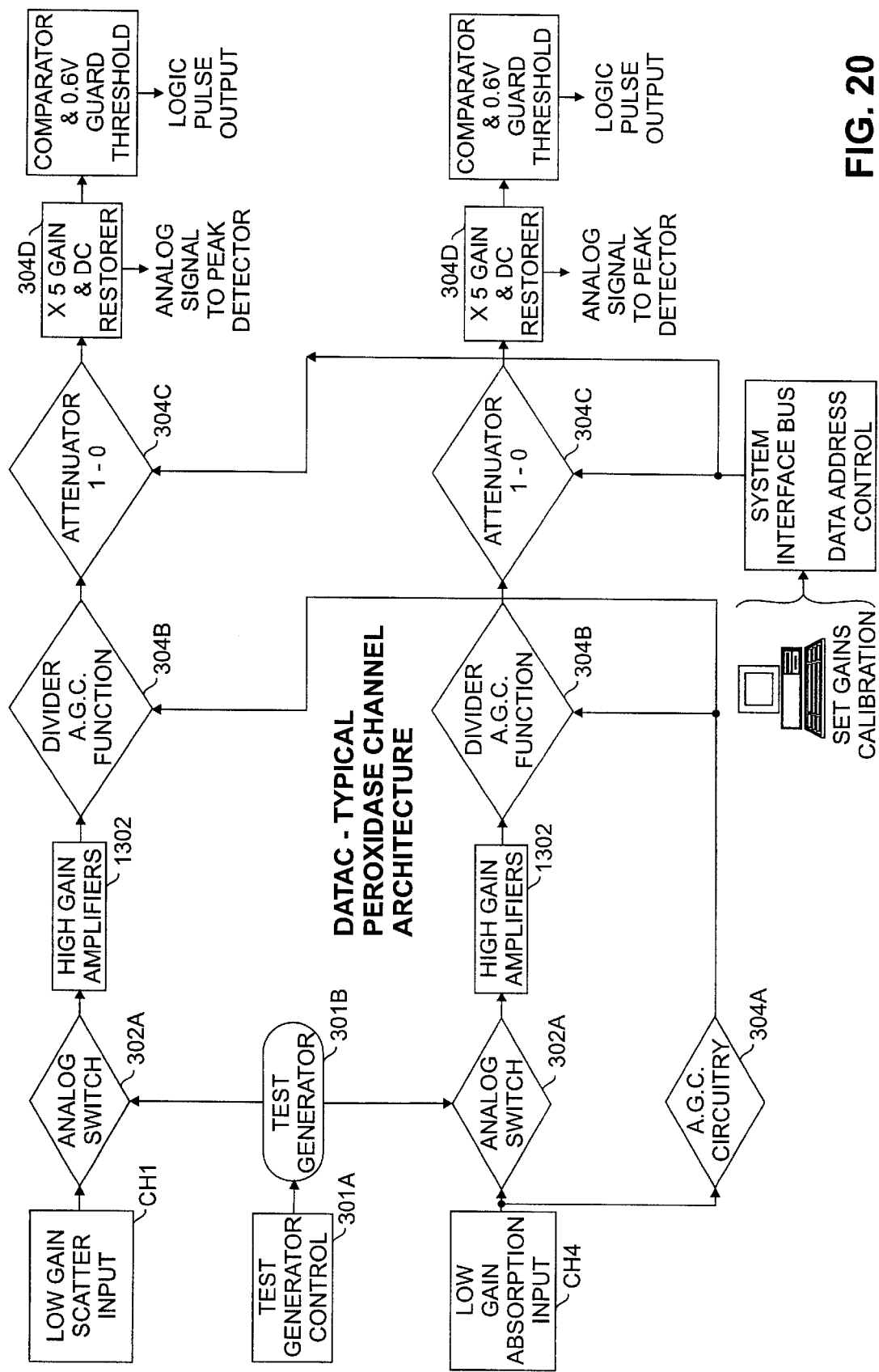
FIG. 20 is a functional schematic diagram of a portion of the Data Acquisition Board of FIG. 19.

Referring to FIG. 20, further details of portions of the PEROX channel of FIG. 16 are shown. Similar to the RBC/BASO circuit of FIG. 19, the PEROX channel also includes analog switches 302*a*, which in this case can select between on the one hand the high gain scatter input of CH1 and the high gain absorption input of CH4 and on the other hand the test pulses output by test generator 301*b* (under the control of test generator control 301*a*). The PEROX channel also includes automatic gain control circuit 304*a* and the divider circuits 304*b*, which respectively provide automatic gain control for the two analog signal channels CH1 and CH4, using a division functionality. Again, alternate automatic gain control circuits could be used.

At the output of the automatic gain control, the analog signals are input to attenuator circuits 304*c* which provides a programmable gain in the range of from 0 to 1 and to an amplifier circuit 304*d*, which provides a gain of 5 and dc restoration of the ac coupled analog signals. The attenuator circuits 304*c* are operated by the system controller 107 to select the calibration of the gains in these analog channels. The output of each amplifier circuit 304*d* is provided to peak detection circuitry and separately to the comparator 1344. The comparators 1344 provide the 0.6 v threshold used to discriminate potentially valid pulses as described elsewhere. The peak-detectors acquire the peak value, pending the response to the FPGA 1346 confirming that the signal is from a valid pulse.

It should be understood that the same attenuator and amplifier circuits 304c and 304d are used, although not shown, in the hybrids 1304 of the RBC/BASO/RETIC circuit illustrated in FIGS. 19 and 20.

The hemoglobin determination, which is discussed more in connection with the HGB Node, is conventionally performed calorimetrically at 546 nanometers. Although it is not part of the DATAC 115, it is briefly discussed here in the context of optical data acquisition. For each measurement, a signal current that is directly proportional to the light transmitted through the reaction vessel containing the reacted sample, reagent and diluent mixture is produced by a photodiode. The signal current is converted to a voltage and then output to the analog to digital converter on the HGB Node 122 (FIG. 14B). The equivalent digital word is then output to the System CPU 107 in the Analytic Instrument Controller 105 via the CANBUS (FIG. 14A). The CPU 107 determines the hemoglobin concentration by the change in the optical density readings. After each HGB measurement, a baseline reference signal is monitored using a rinse solution in the reaction vessel.

D. Analyzing the Raw Parameters

As set forth herein, several systems are used to acquire a variety of data which describe different characteristics of a test sample, for example, a blood sample. Details of a preferred embodiment for analyzing the data will now be discussed.

A preferred method of constructing a smooth normalized star diagram includes analyzing a set of raw parameter values and forming an overall figure to be displayed which is representative of a particular disease state or conditions for viewing by doctors and patients.

Figure 21:
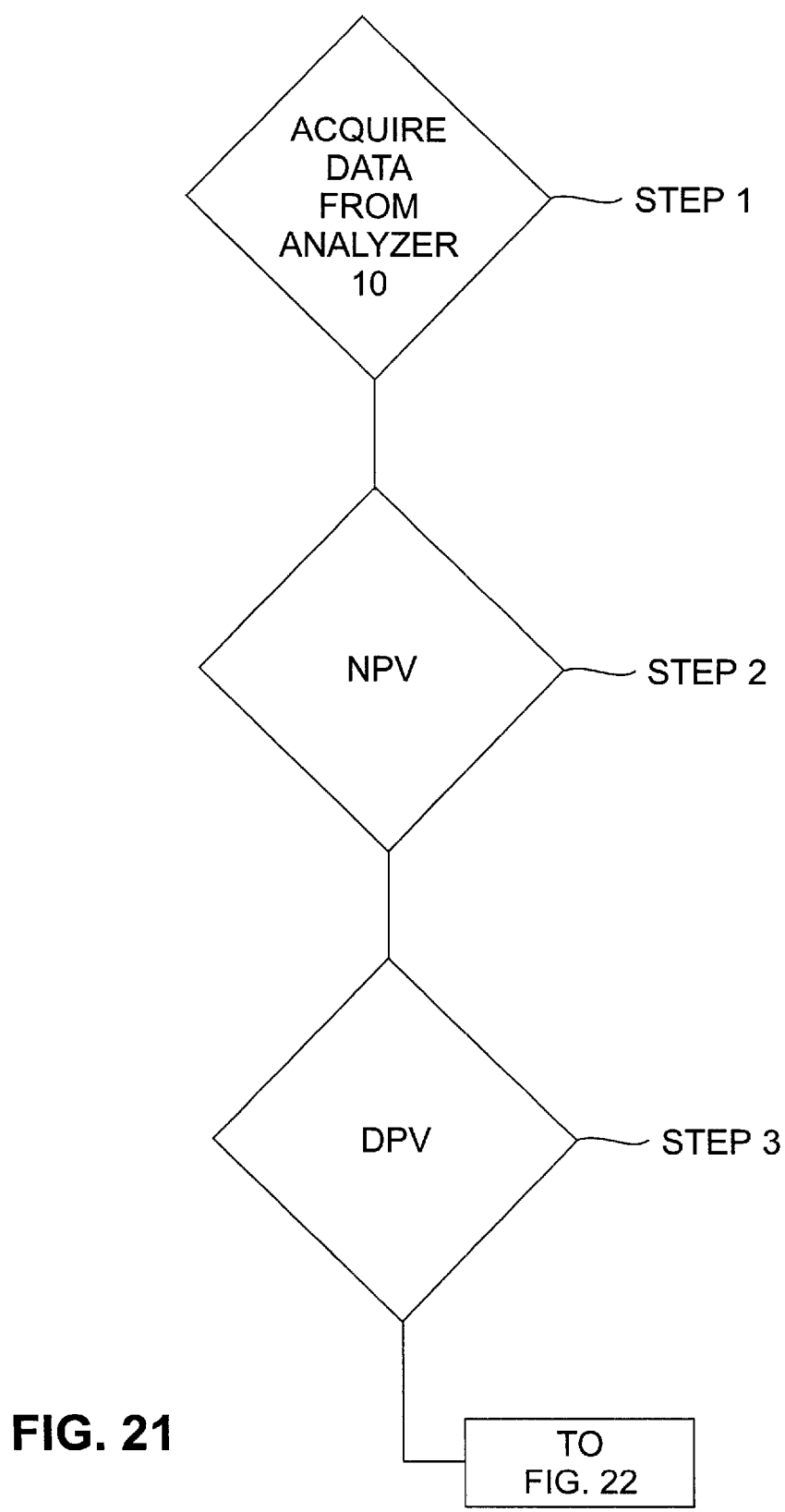
FIG. 21 is a flow chart illustrating a method of the present invention.

For convenience, references in the following discussion to patients, individuals, and persons should be construed synonymously and references to doctors, clinicians, practitioners, etc., are to mean any of a group of people in the field of medicine. Referring now to FIG. 21, a flow chart is shown illustrating a preferred method of the present invention using parameters measured by, for example, the blood analyzer 10, as discussed above.

In step 1, parameter values are measured by the blood analyzer 10 as herein described. It should be recognized that, any number of parameters may be used with the present invention, and in the present example and following applications, eight to ten are measured. In the present example, data is acquired and processed by the electronics architecture 101, in particular the workstation 103, and DATAC board 115. The parameters are measured as raw data or calculated data. In other words, data may be from a direct measurement, e.g., the amount of hemoglobin in a given sample of blood, or a graphical measurement, e.g., the length of a plotted curve such as, for example, the width of a hemoglobin distribution curve. However, it is to be understood that parameters may be obtained for different applications, such as urine tests, and still be used with the present invention. It should also be recognized that data could be measured from cytograms, histograms, charts, graphics, etc.

In step 2, the raw parameter values are then individually scaled using a mean normal value (MNV) and a standard deviation of the mean normal value (SDMNV). Each individual parameter has a mean normal value which is determined by calculating the average of a set of empirical and well-known published data in a conventional manner and thus, will not be further discussed. The MNV for each parameter is generally a value corresponding to a patient with a "normal" condition. A normal condition is herein defined as the state of a person with no disease states or disease conditions. In other words, a measurement of a given parameter, from a patient, is generally the same as the computed MNV and thus, indicates that a patient is in good health (normal) with respect to the given parameter. The SDMNV for each raw parameter value is a function of the MNV and provides a range of values for which a person is still considered to have a normal condition. That is to say, a patient having data that is within a range bounded by the MNV plus SDMNV and the MNV minus SDMNV is a person, generally, having a normal condition. The SDMNV is calculated in what is a well known manner, and therefore will not be further discussed. The normalized parameter value is calculated by:

$$NPV = (PV - MNV)/SDMNV \tag{1}$$

wherein NPV is the normalized parameter value, PV is the raw parameter value, MNV is the mean normal value, and SDMNV is the standard deviation of the mean normal value. Thus, the raw parameter is recomputed as the number of standard deviations from the mean normal value.

As appreciated by applicants and mentioned elsewhere herein, it is possible that a large value may dominate a data set thereby, not only diverting a viewer's attention from the overall shape of the diagram, but also may prevent a diagram from being constructed. As such, in step 3, a range restricting function is applied to scale individually each of the normalized parameter values determined in step 2, as follows:

$$DPV = A * \arctg(B * NPV - C) \tag{2}$$

where DPV is the displayed parameter value and A, B, and C, are constants. In one embodiment, A, B, and C are experimentally determined from a collection of measured data sets in what is now a conventional manner. In other embodiments, A, B, and C could be extrapolated from published and well-know data, similar to the mean normal value (see step 2). The range-restricting function may also be some other sigmoid-type scaling function such as arcsin, arccos or some other exponential function. It should be recognized that the constants A, B, and C will have different values depending on which scaling function is applied. Advantageously, equation (2) provides a method which prevents large variance parameters from dominating all other parameter values. Thus, the spikes found in an overall diagram, as discussed above, are minimized.

Alternatively, it is possible that the parameter values could be restricted using a scaling factor. In yet another embodiment, it should be recognized that a scaling factor in combination with any of the aforementioned range-restricting functions could be used.

Referring now to FIG. 22, in step 4, three concentric circles 20, 22, 24 are drawn around a common center 41. Each MNV and corresponding SDMNV, from step 2, is independently scaled to unity, whereby the middle circle 22 represents the MNV, the inner circle 20 represents the MNV minus SDMNV, and outer circle 24 represents the MNV plus the SDMNV. For example, points 62 and 64, located on circle 22, represent the MNV for two different raw parameters, each having a different magnitude. However, points 62 and 64 are scaled in step 3 such that they are still located along circle 22.

In step 5, the displayed parameter value is assigned to one of a plurality of spokes 40 as shown in FIG. 23. The spokes 40 are drawn from common center 41 and are spaced at equal angular intervals around circles 20, 22, 24, the intervals being defined by:

$$2\pi/N \quad (3)$$

where N is the number of raw parameters measured. The length of any of the spokes 40 corresponds to the magnitude of any of the displayed parameter values in step 3. Thus, the displayed parameter value for any measured raw parameter will be plotted with respect to its corresponding MNV, SDMNV and the interval determined by equation (3).

Referring to FIG. 24, in step 6, individual rays 15 are drawn between the spokes 40 of step 5. The length of any of the rays 15, located between any two spokes 40, (i.e. a ray has a spoke to its left and a spoke to its right) is a weighted sum of the spokes' 40 length and is defined by:

$$R=(L_L*W_R+L_R*W_L)/(W_R+W_L) \quad (4)$$

where R is the rays' 15 length, $L_L$ is the length of the left spoke $40_L$, $W_R$ is the angular distance of the ray to the right spoke, $L_R$ is the length of the right spoke $40_R$, and $W_L$ is the angular distance between the left spoke and the ray. Spokes $40_L$ and $40_R$ can be any of spokes 40 but are herein labeled for clarity.

It is possible, however, that other suitable relationships between the length of spokes 40 of and the angular distances between rays 15 and spokes 40 be used. At step 7 (FIG. 25), the ends of rays 15 are connected by line segments 17, thereby, creating a smooth overall diagram. It is to be understood that line segments 17 may be any length suitable to connect ends of adjacent rays 15 together.

Preferably, every spoke 40 overlays some ray 15. As such, the angular distance between rays 15 is selected such that the distance between any two spokes 40 is an integer multiple of the distance between rays 15 and is measured at intervals of one degree or less, thereby forming a polygon having sequential line segments 17 which are visually indistinguishable from a smooth curve. It should be understood, however, that other suitable angular intervals could be used.

Applications

One of the features of the system and method of the present invention is that various disease states can be classified by comparing random sample data to standards for particular disease conditions. Unlike conventional methods, in accordance with the present invention, standards are determined using empirical and published data (see step 2 ) for each disease state. This permits a physician to classify a random data sample, using standards indicating different disease states, accurately and quickly.

Several applications are shown below which illustrate a standard diagram and then a diagram from a random sample of data for sickle sell anemia and iron deficiency.

Each of which will now be discussed in turn. It should be understood that other disease conditions related to red blood cell, platelet cell and white blood cell diseases could be determined such as beta thal trait and leukemia.

It is also to be understood that the following list of parameters is for illustrative purposes only and not for purposes of limitation, and forms no part of the present invention. In addition, any parameter having a computable MNV and SDMNV may be used with the method of the present invention.

The measured parameters are in Table I as follows:

TABLE I

| | |
|---|---|
| % MICRO | Percentage of Microcytic Blood |
| % RETIC | Percentage of Reticulocytes |
| $CH_r$ | Mean Amount of Hemoglobin Per Reticulocyte |
| CHCM | Cellular Hemoglobin Mean Per Unit Volume |
| HDW | Hemoglobin Distribution Width |
| % HYPER | Percentage of Hyperchromic Cells |
| % MACRO | Percentage of Macrocytic Cells |
| CH | Mean Amount of Hemoglobin Per Cell (RBC) |
| HC | Cellular Hemoglobin Concentration |
| RBC | Number of Red Blood Cells Per Unit of Volume |
| HGB | Amount of Hemoglobin Per Volume of Blood |

Figure 26:
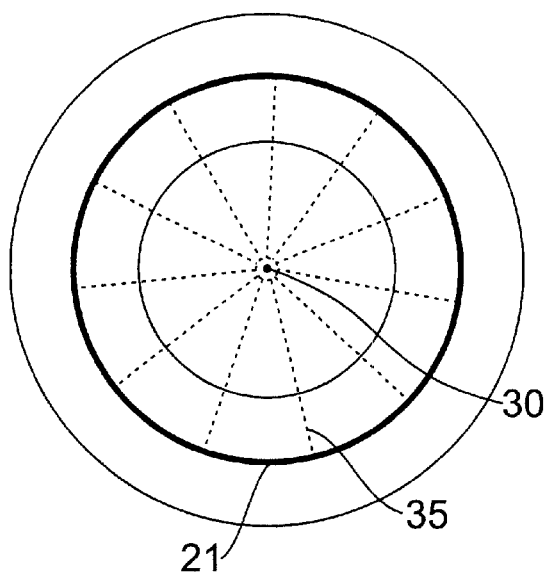
FIGS. 26 and 26 A are diagrammic views illustrating a first application in accordance with the method of FIG. 21.

FIG. 26 shows a diagram representing a "normal" donor, herein defined as a person with a normal condition, as discussed above, having displayed parameter values that are in the range determined by the MNV and SDMNV for each measured parameter.

Spokes 35 are drawn from common center 30 at equal angular intervals as defined by equation (3) of step 3, where N is equal to eleven, which represents the number of measured parameters. Thus, the distance between any two adjacent spokes 35 is approximately 32.7°.

The length of any of the spokes 35 corresponds to its assigned displayed parameter value. As shown in FIG. 26, each of the spokes 35 begin at common center 30 and extend to circle 21, thus indicating that each displayed parameter value is approximately equal to its corresponding mean normal value.

Figure 26A:
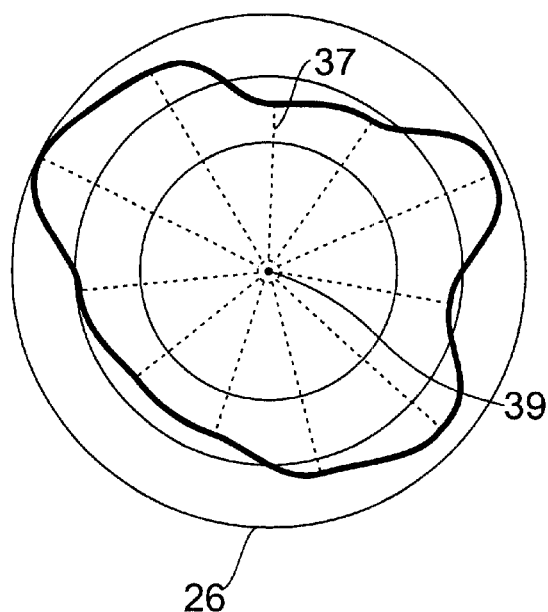

FIG. 26A illustrates a diagram corresponding to a normal donor as herein defined. Each of the spokes 37 extends from center 39 to points bounded by circle 26 thereby indicating that the patient has a normal condition, as discussed above.

In general, physicians, clinicians, and other medical practitioners use charts containing measured data from a blood sample and compare this data to well-known characteristic values for different disease states to see whether a patient's measured data is indicative of a disease condition. Therefore, these characteristic values are used as a standard and are generally the same for occurrences of a particular disease condition.

Figure 27:
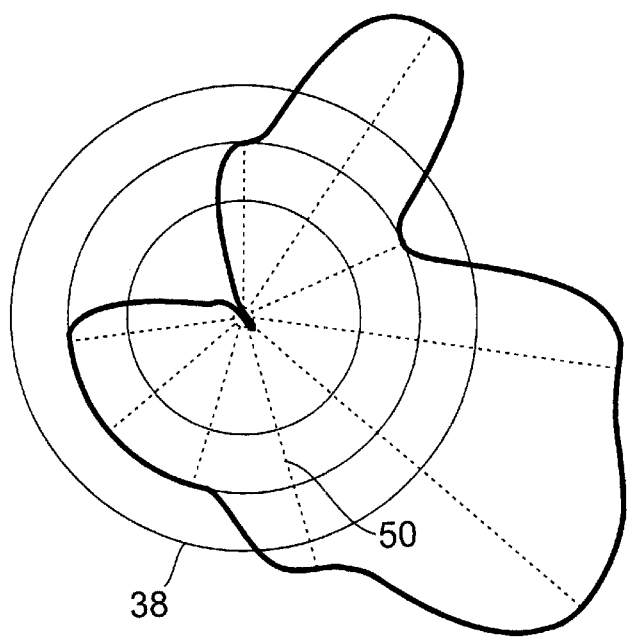
FIGS. 27–28 are diagrammic views showing a second application using the method of FIG. 21.

FIG. 27 shows a diagram representing a standard for a person with sickle cell anemia. The MNV and SDMNV are as described in step 2 and as generally illustrated in FIG. 26. Using equation (3), the angular interval between spokes 50 is approximately 32.7°. It should be recognized that several of spokes 50 (HDW, CHCMdelta, etc.) extend beyond circle 38. This indicates that the patient does not have a normal condition.

Figure 28:
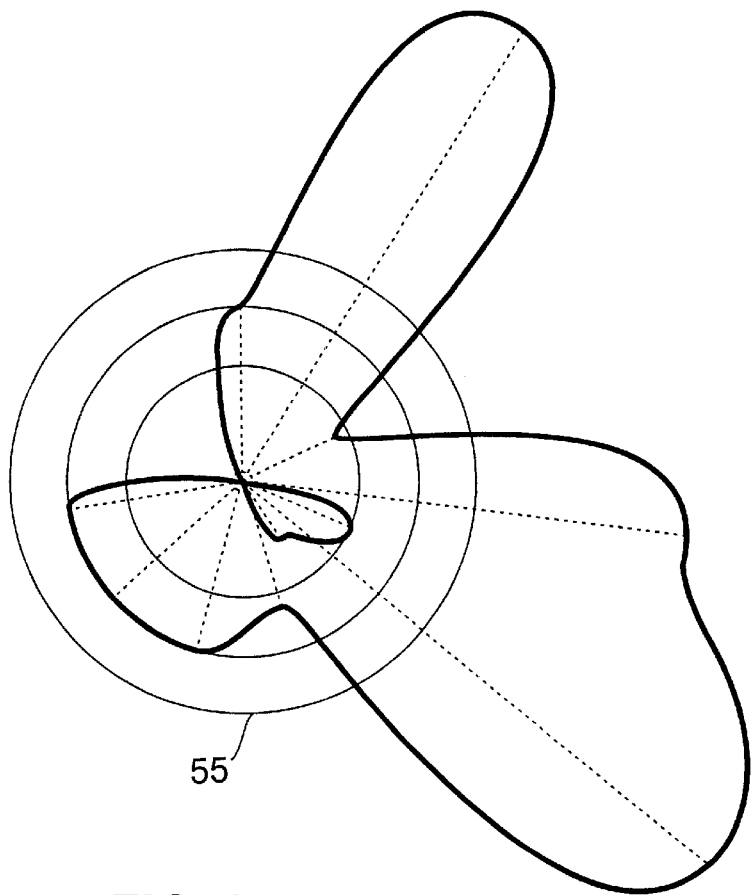

FIG. 28 illustrates a diagram drawn using data from an individual patient having sickle cell anemia measured by analyzer 10 and the method of the present invention.

Comparing FIGS. 27 and 28, it can be seen that the diagram drawn from the random sample has generally a contour, as defined by spokes 55, similar to that of the disease standard illustrated in FIG. 27. It should be understood that diagrams with similar patterns to FIG. 27 can be used in the diagnosis of sickle cell anemia.

Figure 29:
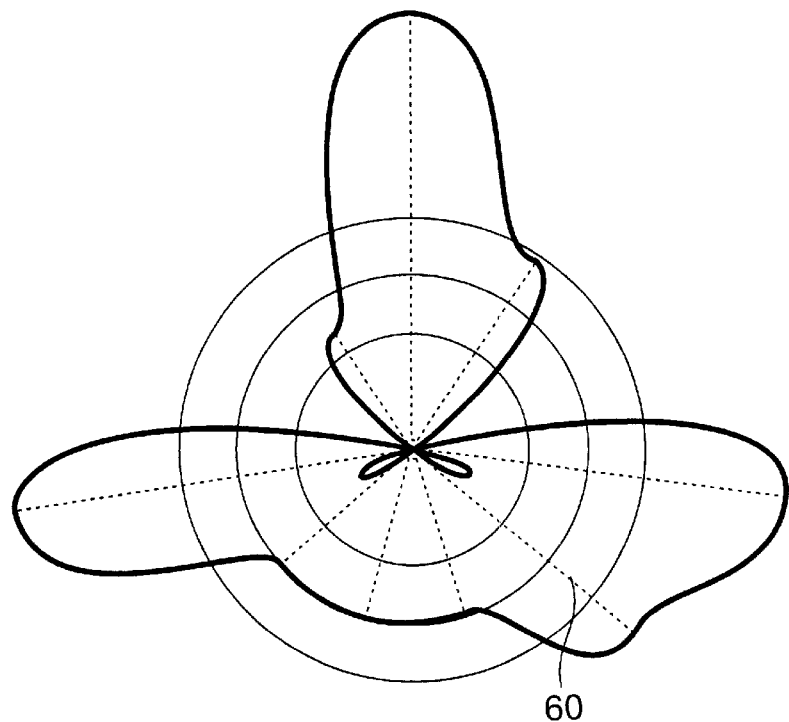
FIGS. 29–30 are diagrammic views illustrating a third application in accordance with the method of FIG. 21.

In FIG. 29, a standard diagram is shown of a person with iron deficiency anemia. The method of obtaining the standard is similar to that of FIG. 27. Using equation (3), the angular interval between spokes 60 is 40°.

Figure 30:
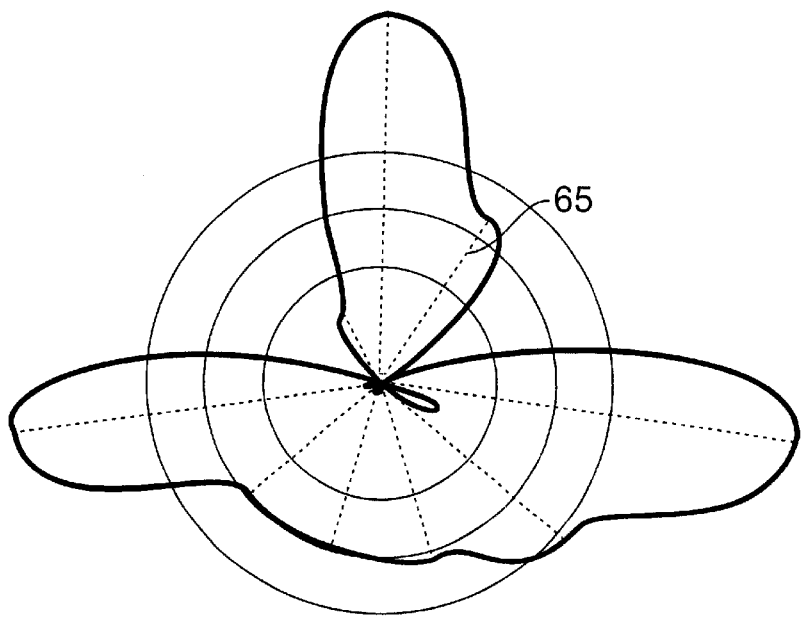

FIG. 30 provides a diagram drawn from an individual patient's blood sample that is generally the same configuration as in FIG. 29, as outlined by spokes 65. As in the case of the previous example, the pattern generated by samples having characteristics of iron deficiency may also be easily recognized by practitioners with the use of a diagram such as in FIG. 29.

In one embodiment, spokes 40 and rays 15 are displayed as end points or data points on a viewed diagram at a distance from the common center 41 having an angular position as determined in steps 5–6 without actually "drawing" or displaying spokes 40 or rays 15. Further, steps 5–7 are preferably performed using software (discussed below) to determine the shape and contour of the curves drawn, as shown in FIGS. 26–30. It is possible, however, that rays 15 and line segments 17 could be displayed on any viewing screen such as a computer monitor.

It should be understood that the present method may be used with any programming language capable of statistical analysis using a programmable computer. Suitable programming languages include Visual Basic, Borland Delphi, C, C++, etc. It should also be understood that the present method could be programmed into a laboratory instrument using instrument software, thus minimizing the amount of hardware needed to analyze the raw data.

The present invention has been described in terms of the preferred embodiments of the invention, which are presented for purposes of illustration and not of limitation. It will be appreciated that modifications, variations, and features within the scope of the invention, given the benefit of the disclosure, will occur to one of ordinary skill in the art.

What is claimed is:

1. A system for displaying a diagram representing a plurality of parameters, comprising:
    means for receiving a raw value for each parameter;
    means for determining a mean normal value and a standard deviation of the mean normal value for each parameter;
    means for computing a normalized parameter value for each parameter, the normalized parameter value being a function of said raw value, mean normal value and the standard deviation of the mean normal value;
    means for computing a displayed parameter value for each parameter as a function of the normalized parameter value using a range restricting function;
    means for displaying three concentric circles with a common center, wherein the inner circle represents the mean normal value minus the standard deviation, the middle circle represents the mean normal, and the outer circle represents the mean normal value plus the standard deviation;
    means for generating and displaying a plurality of spokes having a plurality of lengths, the number of spokes being equal to the number of parameters and the length of any of said spokes being equal to selected ones of said displayed parameter values; and,
    means for forming a plurality of rays located between two adjacent spokes, the length of each ray being a function of a weighted sum of the spokes's length.

2. The system of claim 1 wherein each of the normalized parameter values is computed as:

$$NPV = (PV - MNV)/SDMNV$$

where
NPV is the normalized parameter value,
PV is the parameter value,
MNV is the mean normal value for the parameter, and
SDMNV is the standard deviation of the mean normal value for the parameter.

3. The system of claim 2 wherein each of the displayed parameter values is calculated according to:

$$DPV = A * \text{arctg}(B * NPV - C)$$

where
DPV is the displayed parameter value,
A, B and C are experimental constants, and
NPV is the normalized parameter value.

4. The system of claim 3 wherein the spokes are displayed at equidistant angular intervals around the concentric circles.

5. The system of claim 4 wherein the length of each ray between two adjacent spokes is computed as:

$$R = (L_L * W_L + L_R * W_R)/(W_L + W_R)$$

where
R is the ray's length
$L_L$ is the length of the spoke on the left of the ray,
$W_L$ is the left spoke weight which is also the distance from the ray to the spoke on right of the ray,
$L_R$ is the length of the spoke on the right of the ray, and
$W_R$ is the right spoke weight which is also the distance from the ray to the spoke on the left of the ray.

6. The system of claim 5 wherein the plurality of rays are formed with a uniform angular interval around the concentric circles and an end of the rays of each adjacent ray pairs are connected by a line segment.

7. The system of claim 6 wherein an angular interval between any of said rays is equal to or less than 1°.

8. The system of claim 7 wherein the angular interval is determined such that every spoke overlays some ray and the line segments connecting the rays are so small that the polygon they form is visually indistinguishable from a smooth curve.

9. The system of claim 8 further comprising means for performing a diagnosis wherein said diagnosis is one of a disease state such as sickle cell anemia, beta thal trait, and iron deficiency anemia.

10. The system of claim 9 further comprising a programmable computer wherein said system is installed into said computer.

11. The system of claim 10 wherein said means for receiving is one of a blood analyzer, a chemical analyzer and a urine detector.

12. The system of claim 2 wherein the computing means further comprises computing said displayed parameter values using a scaling function.

13. A method for displaying a plurality of parameters comprising:
    (a) receiving a raw value for each parameter;
    (b) determining a mean normal value and a standard deviation of the mean normal value for each parameter;
    (c) calculating a normalized parameter value for each parameter, the normalized parameter value being defined according to:

$$NPV = (PV - MNV)/ SDMNV$$

where
NPV is the normalized parameter value,
PV is the parameter value,
MNV is the mean normal value for the parameter, and
SDMNV is the standard deviation of the mean normal value for the parameter;

(d) computing a displayed parameter value for each of said normalized parameter values and generating a display of said displayed parameter values wherein said displayed parameter values are determined according to $$DPV = A * \arctg(B * NPV - C)$$

where
DPV is the displayed parameter value,
A, B and C are experimental constants, and
NPV is the normalized parameter value.

14. The method of claim 13 further comprising the steps of displaying three concentric circles with a common center, the inner circle representing the mean normal value minus the standard deviation, the middle circle representing the mean normal value, and the outer circle representing the mean normal value plus the standard deviation, and displaying said displayed parameter values relative to said three circles.

15. The method of claim 14 further comprising assigning each of said displayed parameter values to each of a corresponding plurality of spokes and determining a uniform angular interval between said spokes.

16. The method of claim 15 further comprising the steps of generating a plurality of rays and positioning each ray being between any of said plurality of spokes, and providing each ray with a length calculated by:

$$R = (L_L * W_L + L_R * W_R) / (W_L + W_R)$$

where:
R is the ray's length,
$L_L$ is the length of the spoke on the left of the ray,
$W_L$ is the left spoke weight which is also the distance from the ray to the spoke on right of the ray,
$L_R$ is the length of the spoke on the right of the ray, and
$W_R$ is the right spoke weight which is also the distance from the ray to the spoke on the left of the ray.

17. The method of claim 16 further comprising connecting an end of each ray to each adjacent ray with a line segment.

18. The method of claim 17 wherein the angular interval between rays is equal to or less than 1°.

19. The method of claim 18 further comprising providing a programmable computer and installing said method into said programmable computer.

20. The method of claim 14 further comprising assigning each of the displayed parameter values to each of a corresponding plurality of first data points having a plurality of first distances and determining a uniform angular interval between said first data points.

21. The method of claim 20 further comprising the step of generating a plurality of second data points having a plurality of second distances and positioning each second data point between any adjacent two of said first data points, and providing each second data point with the second distance calculated by:

$$R = (L_L * W_L + L_R * W_R) / (W_L + W_R)$$

where:
R is the second distance from the common center of the second data point,
$L_L$ is the distance from the common center of the first data point on one side of the second data point,
$W_L$ is the one side first data point weight which is also the distance from the second data point to the first data point on the other side of the second data point,
$L_R$ is the distance from the common center of the first data point on the other side of the second data point, and
$W_R$ is the other side first data point weight which is also the distance from the second data point to the first data point on the one side of the second data point.

22. The method of claim 21 further comprising positioning the plurality of second data points at a uniform angular interval around the concentric circles and connecting each pair of adjacent second data points by a line segment.

23. The method of claim 22 wherein the angular interval between any of said second data points is equal to or less than 1°.

24. The method of claim 22 further comprising providing a programmable computer and installing said method into said programmable computer.

25. The method of claim 22 further comprising determining the angular interval such that every first data point overlays some second data point, and wherein the line segments connecting the second data points are so small that the polygon they form is visually indistinguishable from a smooth curve.

26. The method of claim 22 further comprising performing a diagnosis wherein said diagnosis is one of a disease state such as sickle cell anemia, beta thal trait, and iron deficiency anemia.

27. A system for displaying a diagram representing a plurality of parameters, comprising:

means for receiving a raw value for each parameter;

means for determining a mean normal value and a standard deviation of the mean normal value for each parameter;

means for computing a normalized parameter value for each parameter, the normalized parameter value being a function of said raw value, mean normal value and the standard deviation of the mean normal value;

means for computing a displayed parameter value for each parameter as a function of the normalized parameter value using a range restricting function;

means for displaying three concentric circles with a common center, wherein the inner circle represents the mean normal value minus the standard deviation, the middle circle represents the mean normal, and the outer circle represents the mean normal value plus the standard deviation;

means for generating and displaying a plurality of first data points having a plurality of first distances from the common center, the number of first data points being equal to the number of parameters and the first distance from the common center of any of said first data points being equal to a corresponding displayed parameter value; and, means for forming a plurality of second data points located between two adjacent first data points each second data point having a second distance from said common center that is a function of a weighted sum of the distance of said two adjacent first data points.

28. The system of claim 27 wherein each of the normalized parameter values is computed as:

$$NPV=(PV-MNV)/SDMNV$$

where

NPV is the normalized parameter value,

PV is the parameter value,

MNV is the mean normal value for the parameter, and

SDMNV is the standard deviation of the mean normal value for the parameter.

29. The system of claim 28 wherein each of the displayed parameter values is calculated according to:

$$DPV=A*arctg(B*NPV-C)$$

where

DPV is the displayed parameter value,

A, B and C are experimental constants, and

NPV is the normalized parameter value.

30. The system of claim 29 wherein the plurality of first data points are displayed at equidistant angular intervals around the concentric circles.

31. The system of claim 30 wherein the second distance between the two adjacent first data points is computed as:

$$R=(L_L*W_L+L_R*W_R)/(W_L+W_R)$$

where

R is the second distance from the common center of the second data point $L_L$ is the distance from the common center of the first data point on one side of the second data point, $W_L$ is the one side first data point weight which is also the distance from the second data point to the first data point on the other side of the second data point, $L_R$ is the distance from the common center of the first data point on the other side of the second data point, and $W_R$ is the other side first data point weight which is also the distance from the second data point to the first data point on the one side of the second data point.

32. The system of claim 31 wherein the plurality of second data points are formed with a uniform angular interval around the concentric circles and each pair of adjacent second data points are connected by a line segment.

33. The system of claim 32 wherein an angular interval between any of said second data points is equal to or less than 1°.

34. The system of claim 33 wherein the angular interval is determined such that every first data point overlays some second data point and the line segments connecting the second data points are so small that the polygon they form is visually indistinguishable from a smooth curve.

35. The system of claim 34 further comprising a means for performing a diagnosis wherein said diagnosis is one of a disease state such as sickle cell anemia, beta thal trait, and iron deficiency anemia.

36. The system of claim 35 further comprising a programmable computer wherein said system is installed into said computer.

37. The system of claim 36 wherein said means for receiving is one of a blood analyzer, a chemical analyzer and a urine detector.

* * * * *